(12) United States Patent
Tadayon et al.

(10) Patent No.: US 9,338,300 B2
(45) Date of Patent: May 10, 2016

(54) METHOD FOR COMMUNICATING STATUS OR WARNING REGARDING MOBILE DEVICE FUNCTIONS

(75) Inventors: Saied Tadayon, Potomac, MD (US);
Maryam Halavi, Fairfax, VA (US)

(73) Assignee: HYUNDAI MOTOR COMPANY, Seoul (KR)

( * ) Notice: Subject to any disclaimer, the term of this patent is extended or adjusted under 35 U.S.C. 154(b) by 198 days.

(21) Appl. No.: 13/461,968

(22) Filed: May 2, 2012

(65) Prior Publication Data
US 2012/0220284 A1    Aug. 30, 2012

Related U.S. Application Data

(63) Continuation of application No. 12/610,319, filed on Oct. 31, 2009, now Pat. No. 8,315,617.

(51) Int. Cl.
| | |
|---|---|
| *H04B 1/00* | (2006.01) |
| *H04W 24/00* | (2009.01) |
| *H04M 3/53* | (2006.01) |
| *H04W 4/00* | (2009.01) |
| *H04W 4/02* | (2009.01) |
| *H04B 17/21* | (2015.01) |
| *H04M 3/436* | (2006.01) |

(52) U.S. Cl.
CPC .............. *H04M 3/53* (2013.01); *H04W 4/001* (2013.01); *H04W 4/02* (2013.01); *H04W 4/021* (2013.01); *H04B 17/21* (2015.01); *H04M 3/436* (2013.01); *H04M 2207/18* (2013.01); *H04M 2242/14* (2013.01); *H04W 4/027* (2013.01)

(58) Field of Classification Search
CPC ....... H04W 8/245; H04W 64/00; H04W 4/02; H04M 1/72525; H04M 1/72522; H04L 29/08657; G01S 5/0252; G01S 5/02
USPC .................... 455/418, 456.3, 456.4
See application file for complete search history.

(56) References Cited

U.S. PATENT DOCUMENTS

| | | | |
|---|---|---|---|
| 5,128,981 | A | 7/1992 | Tsukamoto et al. |
| 7,149,533 | B2 | 12/2006 | Laird et al. |
| 7,565,132 | B2 | 7/2009 | Ben Ayed |
| 7,881,710 | B2 | 2/2011 | Keohane et al. |

(Continued)

OTHER PUBLICATIONS

United States Office Action issued in U.S. Appl. No. 13/401,795 dated Nov. 6, 2014.

(Continued)

*Primary Examiner* — William D Cumming
(74) *Attorney, Agent, or Firm* — McDermott Will & Emery LLP

(57) ABSTRACT

This provides for controlling mobile device functions and features. For example, it limits or disables the use of some of mobile device features which could cause distraction to the user, when the user is engaged in another activity. In an example, it enables other mobile device features based on occurrence of events related to the user or environment. Another example addresses controlling the mobile device features, such as SMS, while the user is in a vehicle or driving. Another example restricts the ability of the driver of a vehicle to text, while the vehicle is in motion, by automatically disabling the texting ability of mobile device within and around the perimeter of the driver's seat. Other variations, examples, improvements, detection mechanisms, models, techniques, calculations, verification mechanisms, and features are also described in details.

31 Claims, 21 Drawing Sheets

(56) References Cited

U.S. PATENT DOCUMENTS

| | | | |
|---|---|---|---|
| 7,933,611 B2 | 4/2011 | Bocking et al. | |
| 8,145,199 B2 | 3/2012 | Tadayon et al. | |
| 8,238,982 B2 | 8/2012 | Zinn et al. | |
| 8,315,617 B2* | 11/2012 | Tadayon et al. | 455/418 |
| 8,353,052 B2 | 1/2013 | Larsson et al. | |
| 8,378,826 B2 | 2/2013 | Mercier et al. | |
| 8,380,222 B2 | 2/2013 | Alles et al. | |
| 8,428,024 B2 | 4/2013 | Haddad | |
| 8,452,868 B2 | 5/2013 | Shafer et al. | |
| 8,458,806 B2 | 6/2013 | Moosavi | |
| 8,493,029 B2 | 7/2013 | Winger et al. | |
| 8,499,324 B1 | 7/2013 | Mitchell et al. | |
| 8,508,367 B2 | 8/2013 | Shafer | |
| 8,601,595 B2 | 12/2013 | Gelvin et al. | |
| 8,630,686 B2 | 1/2014 | Holman, IV et al. | |
| 8,634,796 B2 | 1/2014 | Johnson | |
| 8,698,895 B2 | 4/2014 | Nerayoff et al. | |
| 8,698,896 B2 | 4/2014 | Nerayoff et al. | |
| 8,699,433 B2 | 4/2014 | Haddad | |
| 8,702,506 B2 | 4/2014 | Hall | |
| 8,712,056 B2 | 4/2014 | Hall | |
| 8,717,931 B2 | 5/2014 | Taniuchi et al. | |
| 8,718,255 B2 | 5/2014 | Yap et al. | |
| 8,718,598 B2 | 5/2014 | Johnson | |
| 8,719,840 B2 | 5/2014 | Musial et al. | |
| 8,767,687 B2 | 7/2014 | Khanduri | |
| 2002/0042743 A1 | 4/2002 | Ortiz et al. | |
| 2004/0115722 A1 | 6/2004 | Kronick et al. | |
| 2005/0221841 A1 | 10/2005 | Piccionelli et al. | |
| 2011/0105097 A1 | 5/2011 | Tadayon et al. | |
| 2011/0195699 A1 | 8/2011 | Tadayon et al. | |
| 2012/0149341 A1* | 6/2012 | Tadayon et al. | 455/412.1 |
| 2012/0214466 A1 | 8/2012 | Tadayon et al. | |
| 2012/0214467 A1 | 8/2012 | Tadayon et al. | |
| 2012/0214468 A1 | 8/2012 | Tadayon et al. | |
| 2012/0214469 A1 | 8/2012 | Tadayon et al. | |
| 2012/0214470 A1 | 8/2012 | Tadayon et al. | |
| 2012/0214471 A1 | 8/2012 | Tadayon et al. | |
| 2012/0214472 A1 | 8/2012 | Tadayon et al. | |
| 2012/0220283 A1 | 8/2012 | Tadayon et al. | |
| 2012/0220284 A1 | 8/2012 | Tadayon et al. | |
| 2012/0309317 A1 | 12/2012 | Zinn et al. | |
| 2013/0003798 A1 | 1/2013 | Goldburg et al. | |
| 2013/0210360 A1 | 8/2013 | Ljung et al. | |
| 2013/0337774 A1 | 12/2013 | Johnson | |
| 2013/0337789 A1 | 12/2013 | Johnson | |
| 2013/0337836 A1 | 12/2013 | Johnson | |
| 2013/0337841 A1 | 12/2013 | Johnson | |
| 2014/0056243 A1 | 2/2014 | Pelletier et al. | |
| 2014/0057569 A1 | 2/2014 | Toivanen et al. | |
| 2014/0066014 A1 | 3/2014 | Nicholson et al. | |
| 2014/0068010 A1 | 3/2014 | Nicholson et al. | |
| 2014/0068713 A1 | 3/2014 | Nicholson et al. | |
| 2014/0098000 A1 | 4/2014 | Ali et al. | |
| 2014/0098686 A1 | 4/2014 | Panta et al. | |
| 2014/0113619 A1 | 4/2014 | Tibbitts et al. | |
| 2014/0280962 A1 | 9/2014 | Schultz | |

OTHER PUBLICATIONS

United States Office Action issued in U.S. Appl. No. 13/401,795 dated Apr. 8, 2014.
United States Office Action issued in U.S. Appl. No. 13/461,903 dated Jun. 5, 2014.
United States Office Action issued in U.S. Appl. No. 13/461,946 dated Nov. 21, 2014.
United States Office Action issued in U.S. Appl. No. 13/461,946 dated May 27, 2014.
United States Office Action issued in U.S. Appl. No. 13/461,955 dated Nov. 6, 2014.
United States Office Action issued in U.S. Appl. No. 13/461,955 dated May 6, 2014.
United States Office Action issued in U.S. Appl. No. 13/461,959 dated Nov. 26, 2014.
United States Office Action issued in U.S. Appl. No. 13/461,959 dated May 12, 2014.
United States Office Action issued in U.S. Appl. No. 13/461,977 dated Nov. 19, 2014.
United States Office Action issued in U.S. Appl. No. 13/461,989 dated Nov. 24, 2014.
United States Office Action issued in U.S. Appl. No. 13/461,989 dated May 27, 2014.
United States Office Action issued in U.S. Appl. No. 13/462,001 dated Dec. 16, 2014.
United States Office Action issued in U.S. Appl. No. 13/462,001 dated Jun. 3, 2014.
United States Office Action issued in U.S. Appl. No. 12/610,319 dated Jul. 3, 2012.
United States Office Action issued in U.S. Appl. No. 13/091,119 dated Nov. 30, 2011.
United States Office Action issued in U.S. Appl. No. 13/091,119 dated Nov. 1, 2011.
United States Notice of Allowance issued in U.S. Appl. No. 13/461,903 dated Mar. 23, 2015.
United States Notice of Allowance issued in U.S. Appl. No. 12/610,319 dated Sep. 28, 2012.
United States Notice of Allowance issued in U.S. Appl. No. 13/091,119 dated Feb. 8, 2012.
United States Office Action issued in U.S. Appl. No. 13/461,977 dated Jun. 3, 2014.
United States Office Action issued in U.S. Appl. No. 13/461,936 dated Nov. 18, 2014.
United States Notice of Allowance issued in U.S. Appl. No. 13/461,936 dated Mar. 27, 2015.
Notice of Allowance issued in related U.S. Appl. No. 13/401,795 dated Jun. 8, 2015.
United States Office Action issued in U.S. Appl. No. 13/461,903 dated Nov. 10, 2014.
United States Notice of Allowance issued in U.S. Appl. No. 13/461,903 dated Sep. 16, 2015.
United States Notice of Allowance issued in U.S. Appl. No. 13/461,936 dated Jun. 5, 2015.
United States Office Action issued in U.S. Appl. No. 13/461,936 dated May 12, 2014.
United States Office Action issued in U.S. Appl. No. 13/461,946 dated Oct. 8, 2015.
United States Final Office Action issued in U.S. Appl. No. 13/461,955 dated Sep. 17, 2015.
United States Notice of Allowance issued in U.S. Appl. No. 13/461,959 dated Jun. 16, 2015.
United States Notive of Allowance issued in U.S. Appl. No. 13/461,977 dated Jun. 9, 2015.
Notice of Allowance issued in related U.S. Appl. No. 13/461,989 dated Sep. 17, 2015.
Notice of Allowance issued in related U.S. Appl. No. 13/462,001 dated Sep. 18, 2015.

* cited by examiner

METHOD FOR COMMUNICATING STATUS OR WARNING REGARDING MOBILE DEVICE FUNCTIONS

RELATED APPLICATIONS

This application is a continuation of an earlier U.S. application Ser. No. 12/610,319, filed on Oct. 31, 2009 now U.S. Pat. No. 8,315,617, by the same inventors and same assignee. This application claims benefit of the priority date of the co-pending U.S. application Ser. No. 12/610,319. This application incorporates by reference the entire teaching and specification of the co-pending U.S. application Ser. No. 12/610,319.

BACKGROUND OF THE INVENTION

Modern mobile devices provide many functionalities including telephony (e.g., cellular phone, VOIP), PDA (personal digital assistance) (e.g., contact/address list, games, photos), network connectivity (e.g., Internet web browser, email, short message service (SMS), mapping/location services). Generally, the mobile device user explicitly controls which applications/functionalities to use at a given moment. For example, the user might use SMS services (or texting) at any location where there might be network connectivity. Given that the network connectivity has become more prevalent, the mobile device users tend to use the functionality of mobile devices in more places and situations.

An example of these mobile device functionalities is the text messaging (or texting) which is a communication method between mobile devices over cellular networks wherein short written messages are exchanged between mobile telephone devices, using a communication service standard commonly known as SMS. Given the gateways between the IP networks and telephone networks, one or more SMS users may be on one or both types of networks. This messaging service has been extended to Multimedia Messaging Service (MMS) to include multimedia messages, e.g., containing video, still image, and sound.

This method of communication and its underlying technology has grown to such a great level that it has become one of the most widely used form of mobile communication in the world, wherein almost every mobile phone service provider has made it available to its users as part of its service, covering several billions active users, spanning almost every age group.

The typical mobile device (shown schematically in FIG. 6) includes an audio interface (612) block connected to speaker unit (610) and microphone (611) on one side, and digital signal processor (DSP) block (613) on the other side. Audio interface block usually includes a digital-to-analog converter (DAC), being coupled to a speaker, and an analog-to-digital converter (ADC), being coupled to microphone, to digitize the audio voice and to send the digitized voice to DSP for further processing. DSP, which is considered processing heart of the mobile telephone system, communicates with audio interface block and RF interface block (616), and digitally performs such signal processing functions as speech coding/decoding, error detection/correction, channel coding/decoding, signal equalization, and demodulation, as is well-known to those skilled in the art.

Typically, DSP performs under the control of microprocessor/controller (615), and may further be coupled to an application specific integrated circuit (ASIC) block (614), where it can help with the operation of DSP in some application specific functions in the background, as known to those skilled in the art. RF interface block which is coupled to DSP, receives digitally processed base band signal from DSP, and it for example performs quadrature (complex) modulation on the digital base band signal, converts the modulated digital signal to analog form, using digital-to-analog converter, and sends the modulated analog signal to transmitter block (618) for further frequency up conversion to radiofrequency (RF), for wireless transmission through power amplification block (621) and antenna (622).

In the receiving side of mobile telephone system, downlink wireless RF signals are received by the receiver block (619) via the antenna. Receiver block amplifies the received RF signal through an automatic gain control unit, down converts the amplified RF signal to intermediate frequency (IF) by mixing it with a locally generated reference signal (620), and passes the IF signal on to interface block (616) for quadrature (complex) demodulation, with filtering and analog-to-digital conversion as is well-known to those skilled in the art.

Digital signal processor (DSP) block receives the digitized IF signal from the interface block and performs various signal processing techniques such as demodulation, equalization, error detection/correction, and signal detection, and forwards the detected signal (i.e. voice) to audio interface block, to be converted to analog voice, amplitude controlled (i.e. amplified or attenuated) and sent to the speaker block.

As those skilled in the art recognize, most of the above operation is performed under the control of microprocessor/controller block (615). In a typical mobile telephone system, as depicted above, microprocessor/controller block performs such functions as level 2/3 protocol, radio services management, man/machine interface, operating system (OS) software, and short message service (SMS). The operations of both keyboard and display (617) are under the control of the microprocessor/controller. Mobile devices also include local memory/storage (623) used by the processor and/or other components of the system.

As is known to those skilled in the art (and from sources such as printed publications or online technical articles, e.g., WIKIPEDIA® (An Internet community information web site)), during the text messaging, microprocessor/controller receives alphanumeric information from the keyboard, uses SMS services software embedded in its memory, converts the alphanumeric information into short message format, and typically sends the generated message to DSP to be processed and sent over the control channel to a short message service center (SMSC), which provides a store-and-forward mechanism to forward the text messages to the intended recipient.

Although this method of communication service has provided unprecedented level of mobile phone subscriber service, it may be desirable to limit/disable the use of some of mobile device features which could cause distraction to the user when the user is engaged in another activity. For example, statistics indicate that the likelihood of being involved in a traffic accident, while driving and using a hand-held device, is four times more than any other situations. One the other hand, it may be desirable to enable other mobile device features based on occurrence of events related to the user or environment. For an example, this invention addresses controlling the mobile device features, such as SMS, while the user is in a vehicle.

SUMMARY OF THE INVENTION

This invention provides for controlling mobile device functions and features. For example, an embodiment of this invention limits or disables the use of some of mobile device features which could cause distraction to the user when the user is engaged in another activity. An embodiment of this invention enables other mobile device features based on occurrence of events related to the user or environment.

An embodiment of this invention addresses controlling the mobile device features, such as SMS, while the user is in a vehicle.

An embodiment of this invention restricts the ability of the driver of a vehicle to text while the vehicle is in motion, by automatically disabling the texting ability of mobile device within and around perimeter of driver's seat, while the vehicle is in motion.

Other variations, examples, improvements, detection mechanisms, models, techniques, calculations, verification mechanisms, and features are also described in details.

DETAILED DESCRIPTION OF THE PREFERRED EMBODIMENTS

Figure 1:
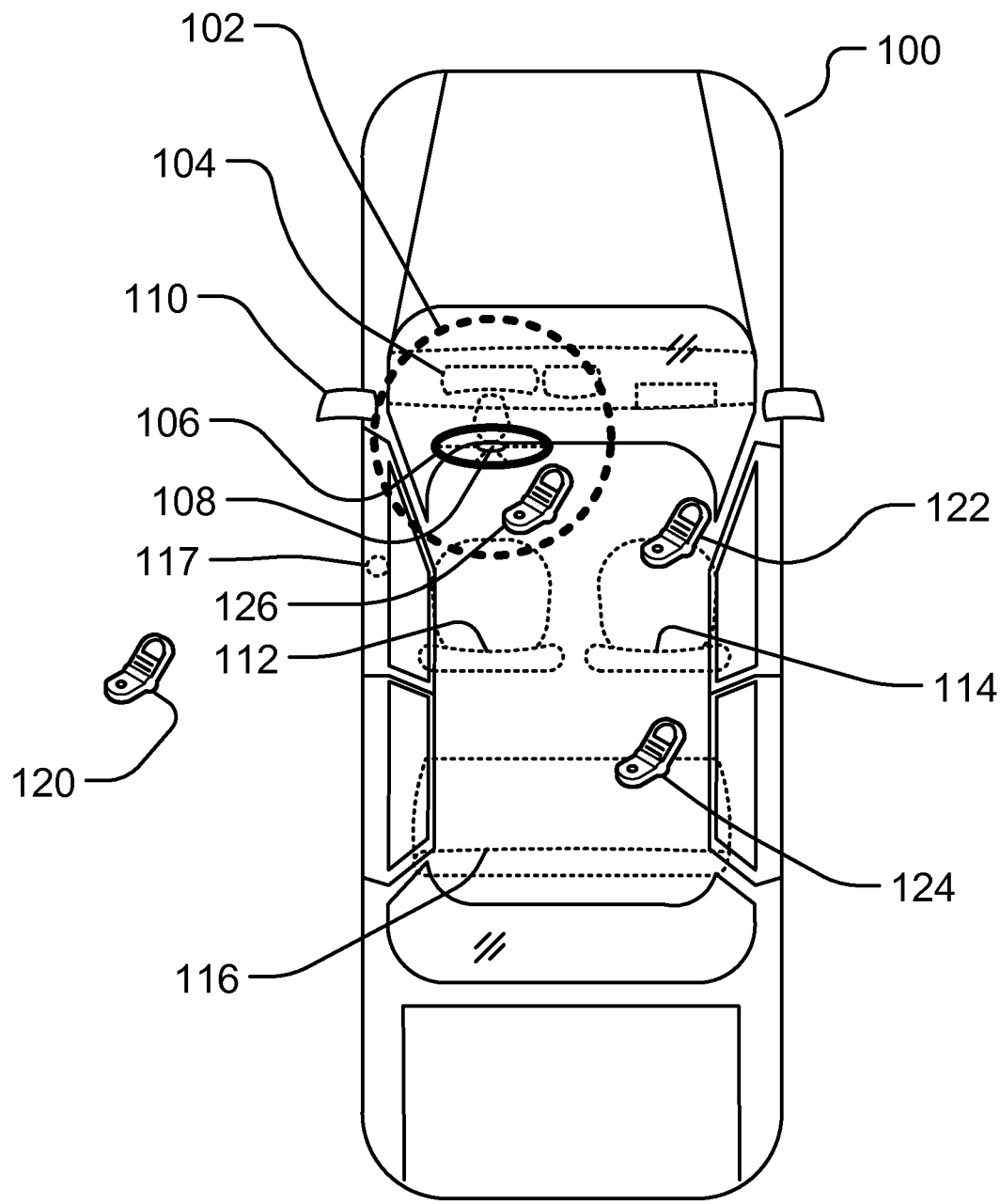
FIG. 1 illustrates several positions of a mobile device within and outside of a vehicle for an embodiment of this invention.

In one embodiment of this invention, as illustrates in FIG. 1, a transceiver (108) is placed on or about the steering wheel (106) of a vehicle (100). In one embodiment, the transceiver (108) has a limited effective range (102) of few feet. In one embodiment, the effective range is about the range of where the driver of the vehicle would be located/seated (e.g., driver seating on the driver seat (112)). In one embodiment, the transceiver is located at/about/under the driver side control panel (104), driver's seat (112), driver's door (117), or driver side mirror (110). In one embodiment, when a mobile device is located outside (120) of vehicle (i.e., sufficiently far (e.g., few feet) from the driver side seat (112), or inside vehicle at/near front (122) passenger seat (114), or at/near backside (124) passenger seat (116), the mobile device is out of effective range (102) of the transceiver (108).

In one embodiment, when localized transmitter/transceiver (e.g., 108) is activated (e.g., by turning on the vehicle (e.g., ignition) and setting the gear outside of Park position), the localized transmitter/transceiver sends a code.

In one embodiment, when the RF signal level received (400) by the mobile device from a localized transmitter/transceiver (e.g., 108) is above a threshold signal level power, the mobile device decodes (or processes as in another embodiment) a code sent by the localized transmitter/transceiver. In one embodiment, the effective range (e.g., 102) of transmitter/transceiver is set so that within the effective range, the received power level by a mobile device (e.g., 126) is above the threshold signal power level, while substantially outside the effective range (e.g., at 120, 122, or 124), the received power level by the mobile device from the localized transmitter/transceiver (108) is lower than the threshold signal level power.

Figure 4:
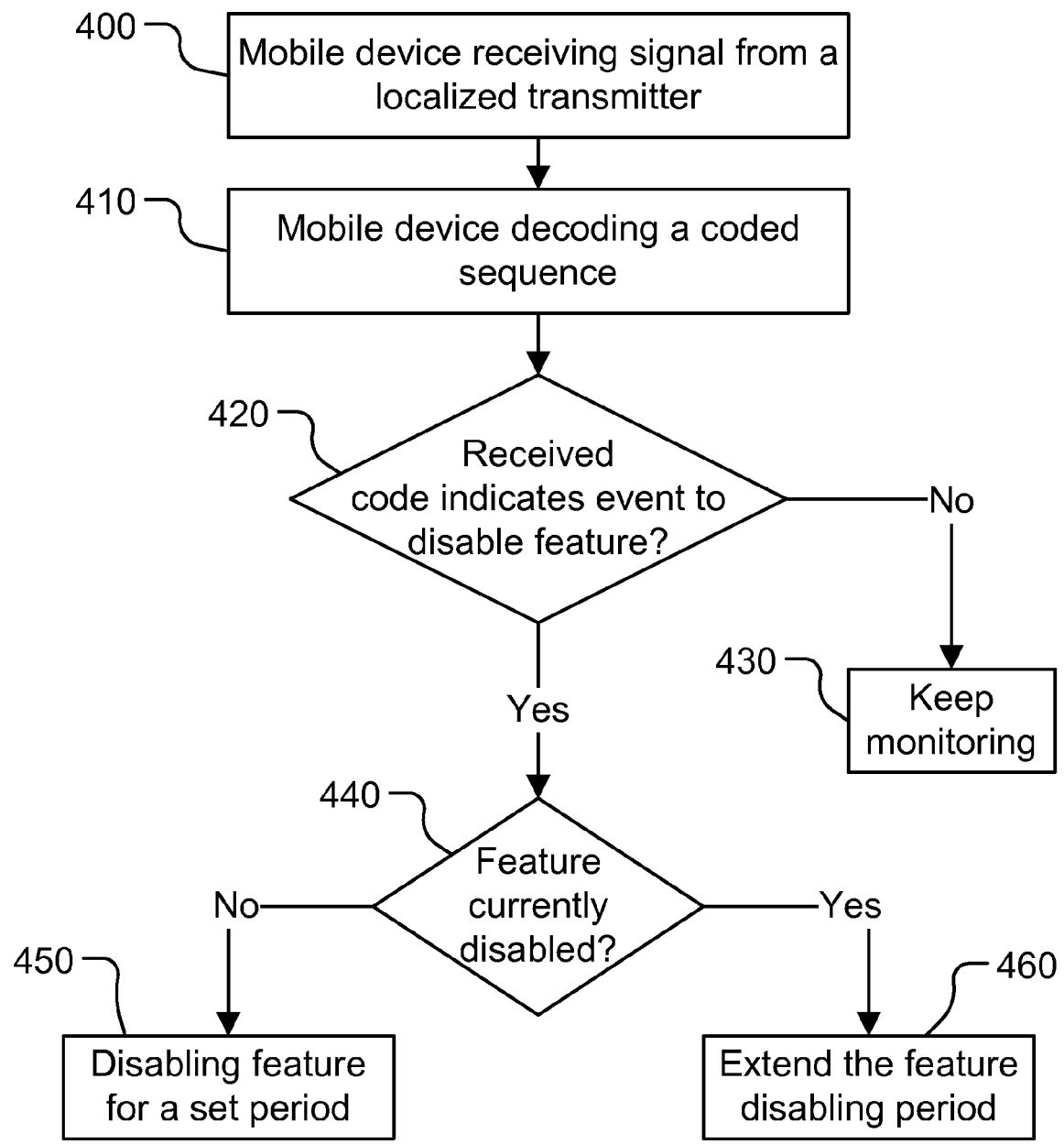
FIG. 4 illustrates steps in disabling/modifying a feature of the mobile device in an embodiment of this invention.

As illustrated by FIG. 4, in one embodiment, after the mobile device receives a signal from a localized transmitter/transceiver (e.g., 108), the mobile device decodes (e.g., via a running program or in firmware) a coded sequence or a code sent from the localized transmitter/transceiver (410). In one embodiment, if the received code matches a preconfigured code or code sequence, it would indicate that an event has occurred (e.g., the mobile device has entered an effective range of the localized transmitter/transceiver). In one embodiment, such event would indicate that one or more feature or functionality of the mobile device (e.g., SMS) should be changed (e.g., to become limited or disabled) (e.g., 420). If so, in one embodiment, the feature (e.g., SMS) of the mobile device is changed (e.g., disabled) if not already disabled (440).

In one embodiment, the duration of the feature modification is a set (450) to a period of time (e.g., 30 seconds).

In one embodiment, upon occurrence of other events (e.g., an emergency event indicated by a signal/input to the mobile device), the disabled or limited feature of the mobile device is restored. In one embodiment, when user dials an emergency number or the mobile device enters an emergency mode, the disabled or limited feature of the mobile device is restored.

In one embodiment, when the code received from the localized transmitter/transceiver indicates e.g., an enabling event, the mobile device terminates the period of feature modification and restores the corresponding feature/functionality. For example, if the driver sets the vehicle on the Park position, the localized transmitter/transceiver sends an enabling code to the mobile device indicating that the feature (e.g., SMS) can be restored. In an embodiment, where a status of vehicle (such as speed) is used to determine the modification of a feature, when the vehicle comes to full stop, the limited feature becomes enabled again (e.g., after a predefined period of time such as 10 seconds), e.g., by sending an enabling code to the mobile device from a localized transmitter.

In one embodiment, the configurations and rules are dynamically configurable via the user interface on the car computer/control, the mobile device, or a remote server (e.g., a web server). In one embodiment, the operational settings (e.g., how often the code is transmitted by the transceivers (e.g., every 15 seconds)) is also configurable via a control panel (e.g., attached to a localized unit via a car computer panel, or via the mobile device).

In one embodiment, when the mobile device receives a code indicating an event to modify (e.g., limit/disable) a feature (e.g., SMS), and the feature is already modified (440) (e.g., SMS is already disabled/limited, e.g., due to prior code transmission), the remaining time period for maintaining the feature modification is extended to a predefined time period (e.g., 460). In one embodiment, the extending time period is the same as the original time period for feature modification. In another embodiment, the extending time period is shorter or longer than the original time period for feature modification. For example, in one embodiment, upon receiving the code from the localized transmitter/transceiver, the SMS feature of the mobile device is disabled/limited for 30 seconds. If after 25 seconds, similar code is again received by the mobile device, the remaining 5 second turns to 30 seconds, in an embodiment for which the original time period is the same as the extending time period for the feature modification. However, in one embodiment, when the extending time period (e.g., 4 seconds) is shorter than the original (e.g., 30 seconds), the remaining time is extended if the remaining time is less than the extending time period. In this example, the remaining time period remains as 5 seconds because it is more than 4-second extending time period. In one embodiment, the remaining time is tracked in a variable (memory location). In one embodiment, the expiration time is stored in a variable (memory location). In one embodiment, the remaining time is updated periodically or the expiration time is checked against the current time (e.g., from local system or synchronized from network via NTP) periodically to determine when expiration is reached.

In one embodiment, one or both of the original time period and the extending time period for the feature modification are configurable on the mobile device. In one embodiment, one or both of these time periods are transmitted to the mobile device via the localized transmitter/transceiver. In one embodiment, the mobile device receives one or both of these time period values from a push (or pull) service from the corresponding telephone carrier or from a server in network or Internet.

In one embodiment, the mobile device is equipped with GPS (Global Positioning System) service or receives its (or vehicle's) position from another GPS system (e.g., from a GPS service on the vehicle or an emergency service provider on the vehicle). In one embodiment, the mobile device or the computer/GPS on the vehicle (periodically or on-demand) determine the locality/jurisdiction/state/country by using mapping/address/location services (e.g., via Internet or a local database). In one embodiment, a change in locality/jurisdiction/state/country is identified by comparing subsequent GPS readings. In one embodiment, upon a change in locality/jurisdiction/state/country, the original time period and the extending time period for the feature modification corresponding to current locality/jurisdiction/state/country is determined, e.g., by querying a local database or downloading data from a service from Internet, and these time values (or other parameters provided by the service, e.g., speed limits) are used subsequently to modify the mobile device feature.

In one embodiment, when and how long to maintain the feature modification is determined by a set of rules and configuration values, which are executed in a rule-based engine (e.g., in a mobile device, vehicle computer, or a server on a network). In one embodiment, the rules are downloaded upon querying by the mobile device or the vehicle's computer based on the geography (e.g., location of the vehicle or mobile device), type of the vehicle, and/or one or more attributes of the driver or passenger(s) (e.g., age, occupation, or exemptions).

In one embodiment, when the mobile device (e.g., 126) whose one of its features is already modified, leaves the effective range of a localized transmitter/transceiver (e.g., 108) or does not receive a further code indicating extension of the feature modification period, the modified feature is restored to previous state when the remaining modification period is over.

Figure 12:
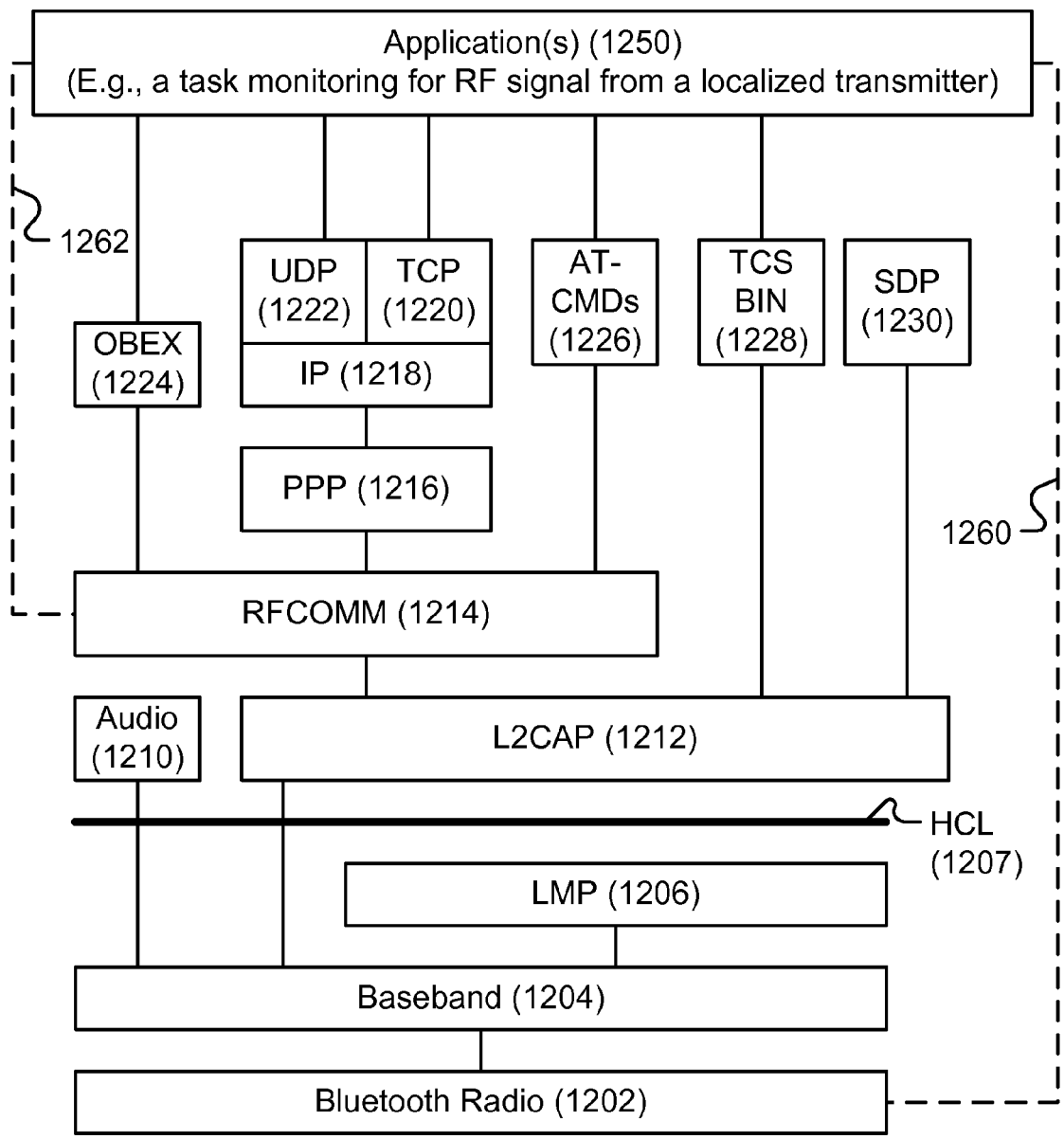
FIG. 12 illustrates a typical BLUETOOTH® (A wireless technology protocol) networking stack with an application layer.

In one embodiment, the mobile device keeps monitoring (e.g., 430) for an RF signal from a localized transmitter/transceiver. For example, in one embodiment, a program/task running on the mobile device periodically checks for such signal or is notified by an underlying hardware/firmware/operating system/RF modules that a signal has been received. In one embodiment, the communication between the local transceiver and the mobile device is performed through BLUETOOTH® (A wireless technology protocol) (or related) technology. FIG. 12 shows a typical transport stack of BLUETOOTH® (A wireless technology protocol) from physical layer (1202) through Application layer (1250). In principle, a signal monitoring application can be implemented at any layer or directly use one or more layers in the stack. In one embodiment, a monitoring application uses OBEX (1224), UDP (1222), or TCP (1220) to communicate with the localized transceiver. For example, in one embodiment, the signal monitoring application opens a port (UDP or TCP) with a predetermined port number for listening for incoming messages. In one embodiment, the signal monitoring application uses (1262) a lower layer such as RCOMM (1214) or L2CAP (1212) directly to communicate with the localized transceiver. In one embodiment, a signal monitoring program determines the received signal power level from drivers or directly from physical layer (or higher layer) (1260). In one embodiment, the monitoring program runs as a background task. In one embodiment, the background task runs even when the mobile device is in sleep mode, e.g., to conserve battery power (e.g., by turning off the display).

Figure 13:
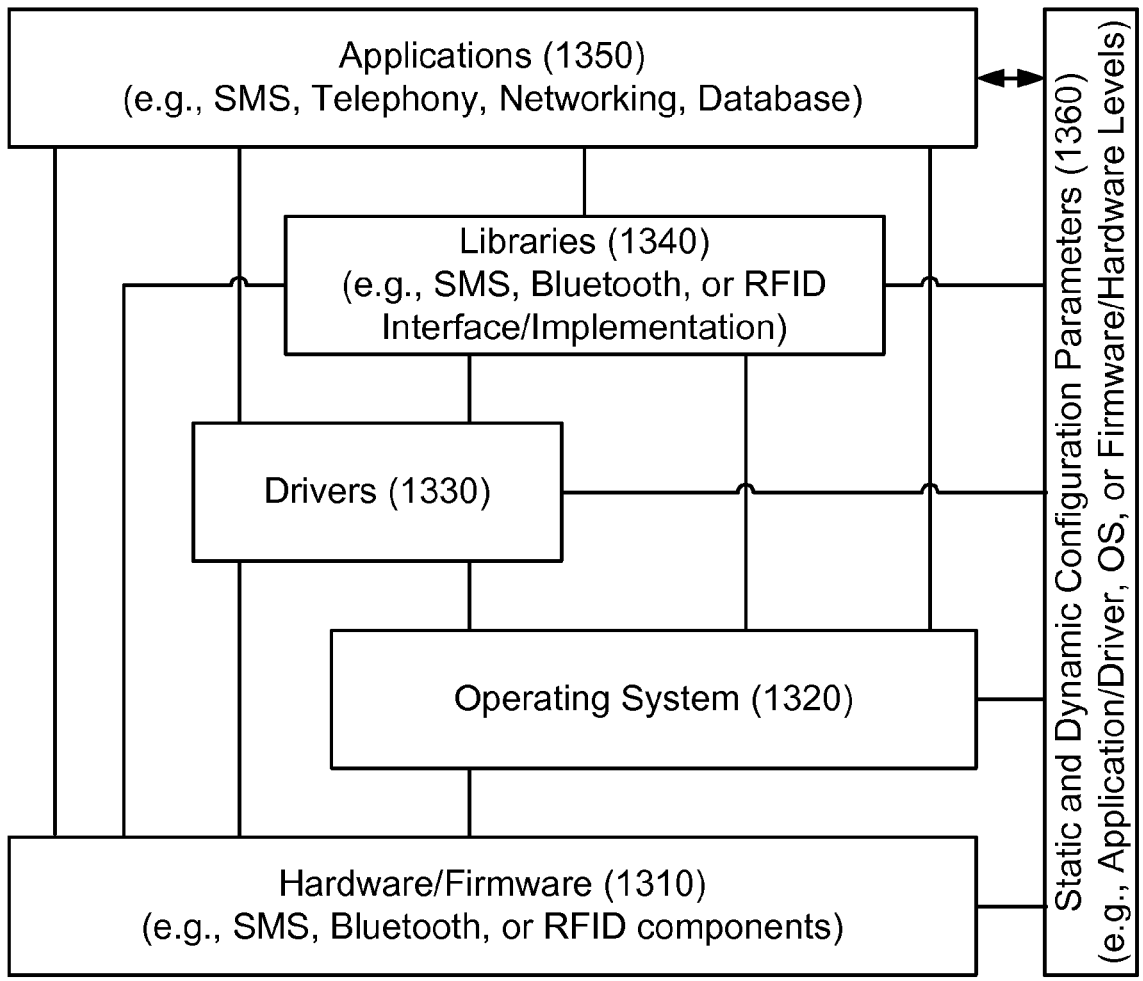
FIG. 13 illustrates dependencies of various software components and configurations in a mobile device.

In one embodiment, when the signal monitoring application receives a code from a localized transmitter/transceiver, it modifies or triggers modification of a mobile device feature/function (e.g., SMS). In one embodiment, the signal monitoring application is integrated part of function/feature to be modified (e.g., integrated or a module of SMS application). In such an embodiment, a tight integration between the signal monitoring module and core functionality control enables one to modify the functionality directly, e.g., via non-public API (Application Programming Interface) or direct calls. In one embodiment, the signal monitoring application and the feature/function to be modified are not as tightly integrated. In such an embodiment, there are various methods that the feature modification may be achieved. For example, the triggering application (i.e., the signal monitoring application) calls one or more APIs of the triggered application (i.e., SMS application), to modify the feature. In such an embodiment, the triggered application supports modification of the feature via those APIs. In one embodiment, the triggering application modifies configuration data (1360) used by the triggered application and/or other underlying software/firmware/hardware. For example, FIG. 13 illustrates a typical application stack and interdependencies between hardware (1310), operating system (OS) (1320), drivers (1330), interface/implementation libraries (1340), and applications (1350), as well as configuration data (1360). Depending on the configuration and the nature of the modules, the behavior of the module is affected by available configurations. Some configurations are allowed to be modified and some are dynamically used by their respective modules. In one embodiment, the triggering application modifies a configuration for a lower level module (e.g., a driver 1330) to modify the feature supported by the driver and used by one or more triggered applications at a higher level (1350). In this case, if there are multiple applications supporting the feature to be modified (e.g., several SMS applications on the mobile device) which use a common module (e.g., a driver), the feature may be modified by configuring/affecting the common module.

In one embodiment, the triggering application identifies (e.g., by querying the OS) the applications/processes that provide the feature to be modified, for example, by using the signatures of those triggered applications. In one embodiment, the triggering application terminates the identified triggered applications (if they are running), e.g., by sending a command to the OS or using an inter-process messaging. In one embodiment, the triggering application prevents launching of the triggered applications via the mobile device user interface, e.g., by temporary disabling access to the triggered application. In one embodiment, the triggering application sends messages via an inter-process messaging to affect the behavior of the triggered application and modify a feature supported by the triggered application.

Figure 2:
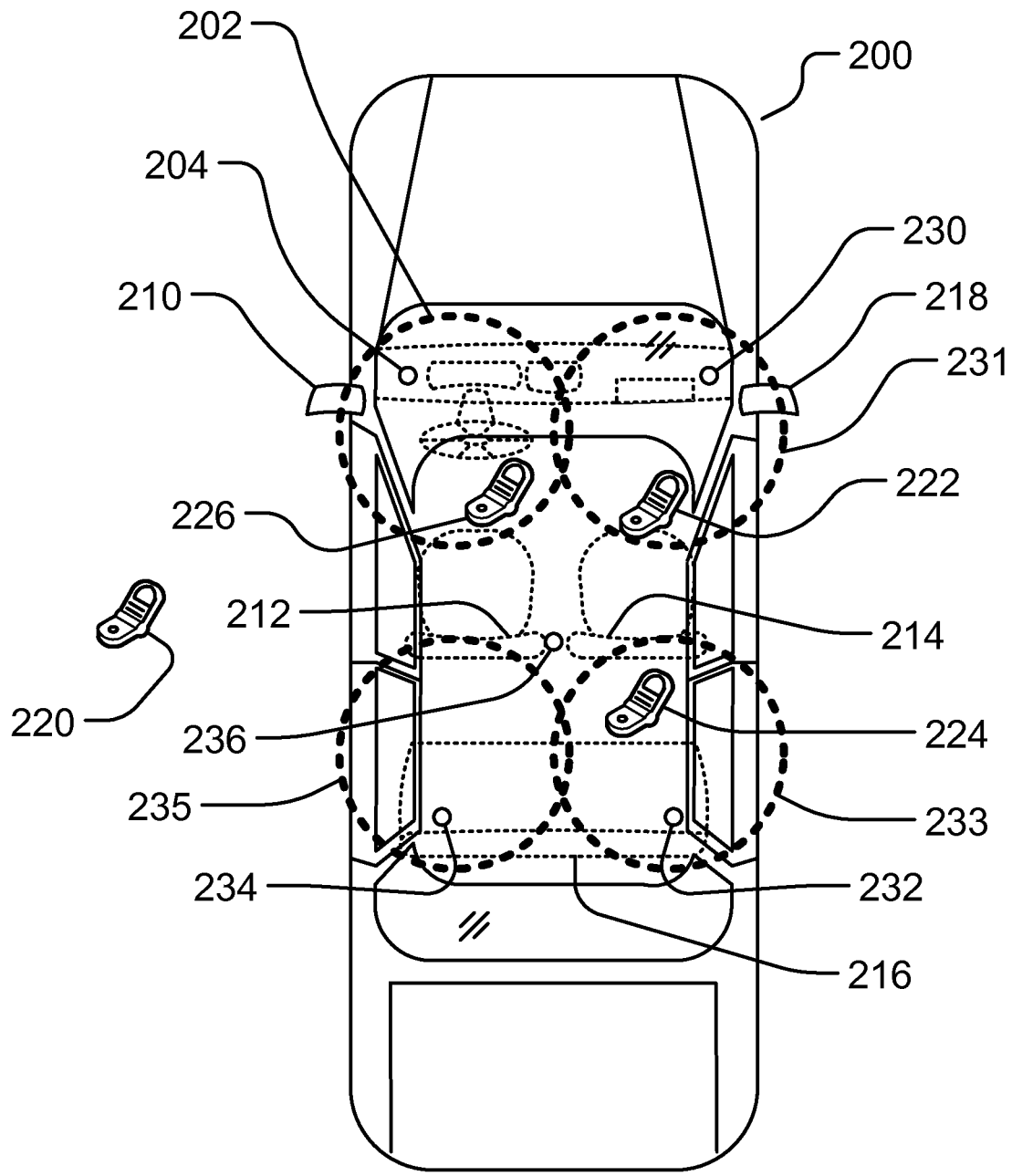
FIG. 2 illustrates multiple transmitters/receivers/transceivers placed, e.g., on a vehicle, used in an embodiment of this invention.

As illustrated in FIG. 2, in one embodiment, multiple local transmitters/transceivers (e.g., 204, 230, 232, 234, and 236) are placed on a vehicle (200). In one embodiment, one or more of these local transmitters/transceivers (e.g., 204, 230, 232, and 234) have a short effective range (e.g., few feet) (e.g., 202, 231, 233, and 235, respectively). In such an embodiment, if the mobile device is moved around inside the vehicle, its location may be monitored/tracked, based on the events related to the mobile device getting in RF range of one or more of these local transmitters/transceivers. In one embodiment, when the mobile device exits the effective range (202) of the local transmitter/transceiver corresponding to the driver (204), and it enters (e.g., at 222) the effective range (e.g., 231) of another local transmitter/transceiver (e.g., 230), the mobile device receives a code indicating, for example, in-range event from local transmitter/transceiver 230, and the modified feature on the mobile device is restored. In such embodiment, instead of driver (at 212) attempting to use a feature (e.g., SMS), the mobile device can be handed to a person on the passenger side (at 214) to perform the function. Similarly, the mobile device (e.g., at 224) can be used by a person on the back seat (216) to perform the task. In one embodiment, if the mobile device is taken outside vehicle (e.g., at 220), the functionality is restored, e.g., due to the lack of receiving a code from the local transmitter/transceiver 204 to extend the feature modification period.

In one embodiment, the multiple transmitters/transceivers are positioned so that their effective ranges map the interior of the vehicle where the driver and passengers might be located (and hence, the potential location of the mobile device(s)). In one embodiment, the power level settings of the multiple transmitter/transceivers are adjusted so that their effective ranges better map the interior of the vehicle, in order to make a more accurate determination of the mobile device location especially close to the driver seat (212). For example, in one embodiment, the front transmitters/transceivers (204, 230) are placed close to mirrors (210 and 218) to reduce overlap between their corresponding effective ranges. In one embodiment, the back transmitter/transceivers (232, 234) are placed behind or above the back seat at the left and right sides of the vehicle.

In one embodiment, one or more transmitters/transceivers (e.g., 236) is placed, e.g., about the center of the vehicle. In one embodiment, such a transmitter is used to calibrate the power level of the other transmitters/transceivers (e.g., 204, 230, 232, and 234). In an embodiment, the power level output of the localized transmitters/transceivers are adjusted based on an RF calibration. This, for example, helps keeping the effective ranges stable by keeping the power levels stable, when the output power levels of these transmitters/transceivers tend to drift over time. In one embodiment, additional transmitters/transceivers (e.g., 236) help better position the mobile device.

Figure 7A:
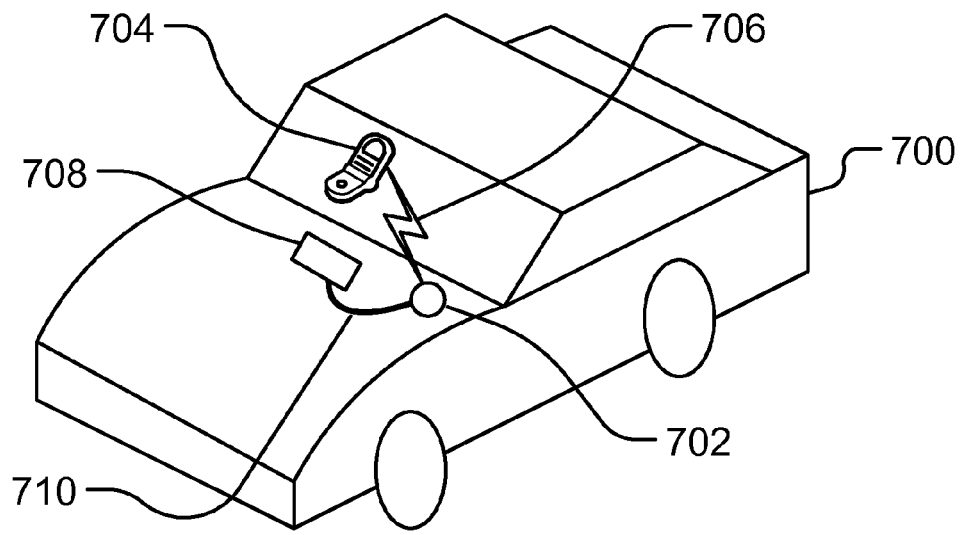
FIGS. 7(a) and 7(b) illustrate a mobile device, a localized unit, and a local computer/control (e.g., of a vehicle) used in an embodiment of this invention.
Figure 7B:
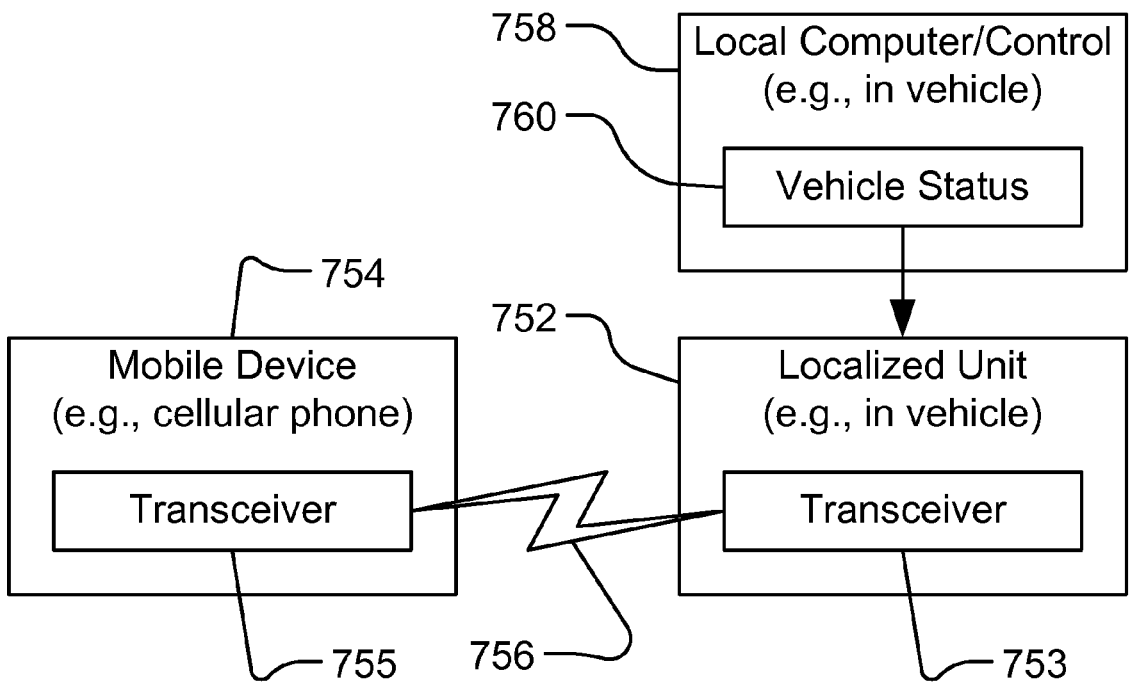

In one embodiment, a transceiver 236 has a higher effective range than the other local transmitters (e.g., 204, 230, 232, and 234). In an embodiment, the mobile device makes the data communication with transceiver 236, while it determines the received power level signals from transmitters 204, 230, 232, and 234, as well as their unique identifiers. Based on these received power levels, the mobile device determines within which effective range(s) it is located, and the mobile device communicates the corresponding identifier(s) to transceiver 236. In one embodiment, transceiver 236 provides the data to a localized unit, and the localized unit provides a code to be sent to the mobile device via transceiver 236. A localized unit is installed on the vehicle, e.g., behind control panel, dashboard, trunk, floor, etc. In one embodiment, transceiver 236 is wired to the localized unit for signaling and power. In one embodiment, transceiver 236 is integrated with the localized unit. In one embodiment, a localized unit uses a processor/controller to perform logical and other calculations, control the transmitters/transceivers, communicate with the mobile device via transceiver(s), and receive data/status from vehicle's computer/control or sensors. FIG. 7 depicts an embodiment of this invention, where the localized unit (702) installed near the vehicle's (700) driver side control panel is integrated with its transceiver. The transceiver communicates (706) with the mobile device (704) when mobile device is on its effective range. The localized device communicates (710) with the vehicle's computer/control (708) system or sensors.

In one embodiment, as depicted in FIG. 7(*b*), the mobile device (754) and the localized unit (752) communicate (756) via their respective transceivers (755, 753), and the localized unit receives vehicle status (760) from the local vehicle's computer/control system. In one embodiment, vehicle's local computer/control share resources with the localized unit, i.e., they are integrated in one unit. For example, the processor, memory, operating system, display, networking, or other components of the vehicle computer system is used for implementing localized unit functionality.

Figure 3A:
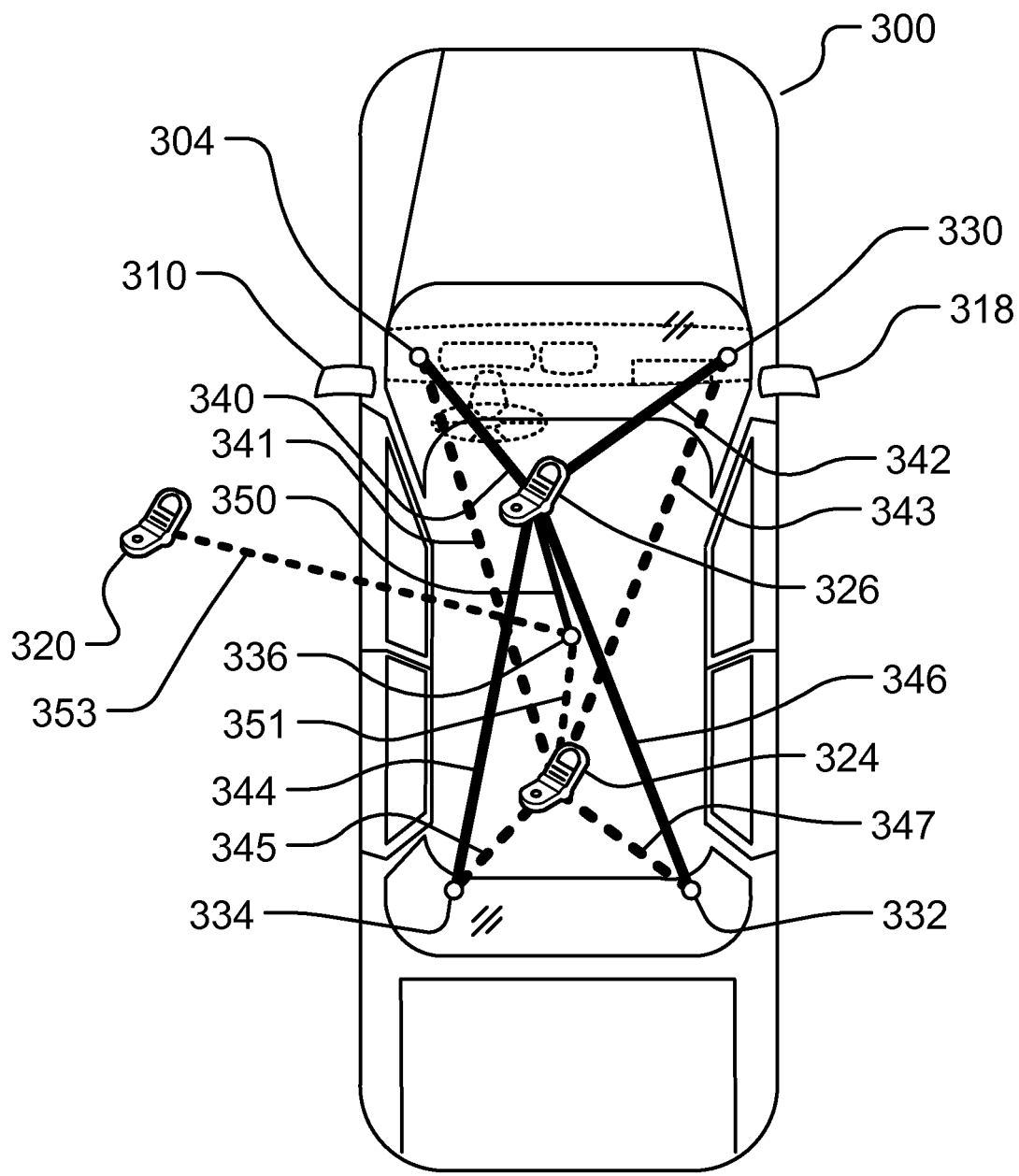
FIG. 3(a) illustrates locating a mobile device, e.g., in or about a vehicle, used in an embodiment of this invention.

In one embodiment, e.g., as illustrated in FIG. 3(a), multiple localized transmitters/transceivers (304, 330, 332, 334, and 336) are placed on a vehicle (300), e.g., with effective ranges of more than few feet. In one embodiment, the effective ranges are set at factory and/or during installation, e.g., during calibration.

In one embodiment, the mobile device location is determined by using the localized transmitters/transceivers. In one embodiment, the location of the mobile device is determined based on the relative timing of signal from the mobile device to the transceivers. In such an embodiment, using the radio wave as media, the time resolution is in order of 1 nsec or less, and the transceiver(s) have stable clocks/reference signal generator (e.g., with low phase noise). For example, one transceiver (e.g., 336) provides a reference RF signal for the other transceivers (304, 330, 332, 334, and 336) to obtain and compare with signals from the mobile device (326).

In an embodiment, the location of the mobile device is determined based on the relative signal power levels from the local transmitters/transceivers, measured at the mobile device. In one embodiment, the power levels are measured at the local transceivers for the signals from other transceivers and the mobile device. Based on the antenna configurations of the transceivers (and other obstacles), a transmitter's signal power level attenuation is dependent on the distance to the transmitter. For example, with the geometric expansion of the radiated wave front, the free space attenuation is given by $r^2 \cdot (4\pi)^2/\lambda^2$, where r is the distance to the transmitter and $\lambda$ is the wavelength of the radiation.

In one embodiment, the relative power levels measured at the mobile device or the local transceivers are used to estimate the relative distances of the mobile device to the local transmitters/transceivers. For example, assuming the attenuation is inversely proportional to $r^2$, in one embodiment, the ratio of distances of the mobile device to two transmitters is proportional to the inverse square root of the ratio of their corresponding signal power level measurements at the mobile device. In one embodiment, once the ratio of distances of the transmitters from the mobile device is determined (for example, by a program on the mobile device or the localized unit), the position of the mobile device is determined with respect to the transmitters.

Given that the attenuation has strong dependence on the distance from the transmitter, in one embodiment, the distance of the mobile device to each transmitter is estimated based on the signal power level received from the transmitters to the mobile device. To help the accuracy of the estimation, in one embodiment, the power level measurement by the mobile device is calibrated by placing the mobile device at one or more predetermined locations with respect to the transmitters during a calibration procedure. For example, in one embodiment, the calibration is performed by placing the mobile device close to the steering wheel, close to dashboard at the front passenger area, on back seats, or in the area between the front and back seats. The calibration is stored (e.g., in the mobile device and associated with the vehicle (300) identification), and it is used to determine the location of the mobile device at a later time. In one embodiment, the calibration program may be run, e.g., in factory, during installation by using a typical or the same mobile device, by authorized personnel, the user, or service repair staff, and the calibration data may be on the mobile device, electronically sent to the user for installation of the mobile device, placed on a server accessible via Internet, for later retrieval, stored on a non-volatile memory/storage of localized unit or accessible to localized unit (such as vehicle's computer/control system).

In one embodiment, the output signal power level of each transmitter/transceiver is measured by other transceiver(s) in order to baseline the relative power output from each transmitter/transceiver, given that the locations of the local transmitter(s)/transceiver(s) remain fixed with respect to each other. For example, the signal output power of transmitter/transceiver 304 is measured by one or more of transceivers 330, 332, 334, or 336. Comparing these power measurements with a set of previously calibrated power measurements provides the amount of deviation in transmitted output power from transmitter/transceiver 304, since the prior calibration. For example, if signal power from transmitter/transceiver 304 (as measured by other local transceivers) has dropped 2 dB (compared to the that during calibration), while the output signal power level out of transceiver 330 (as measured by other transceivers) has increased 1 db since calibration, then in one embodiment, the relative output signal power measurements of the transceivers 304 and 330 (at the mobile device) is adjusted 3 dB compared to that during the calibration. Then, in one embodiment, the adjusted measured transmitted output signals (i.e., adjusted by 2 dB and 1 dB, respectively) and/or the adjusted ratio of the transmitted output power signals (i.e., adjusted by 3 dB) are used as correction factors in estimating the distance of the mobile device to the transmitters.

In one embodiment, the baseline power output measurement(s) of each local transmitter/transceiver (as measured by other local transceivers) is communicated to the mobile device via a transmitter/transceiver (e.g., 336) (or used by localized unit), and the deviations of these baseline power levels from those of the calibration are used as correction factors when determining the distances (or relative distances) of the mobile device to the local transmitters/transceivers. In one embodiment, during calibration of the transmitters/transceivers, the output signal power levels of local transmitters/transceivers are measured at some predefined distance(s) to the transmitters (e.g., 2 feet and 4 feet), in addition to the measurements at the output signal power levels by the other local transmitters/transceivers. This measurement aids in determining more accurate measurement of the distance to each transmitter by providing direct sample point(s) linking the transmitter output power to the distance.

Figure 3B:
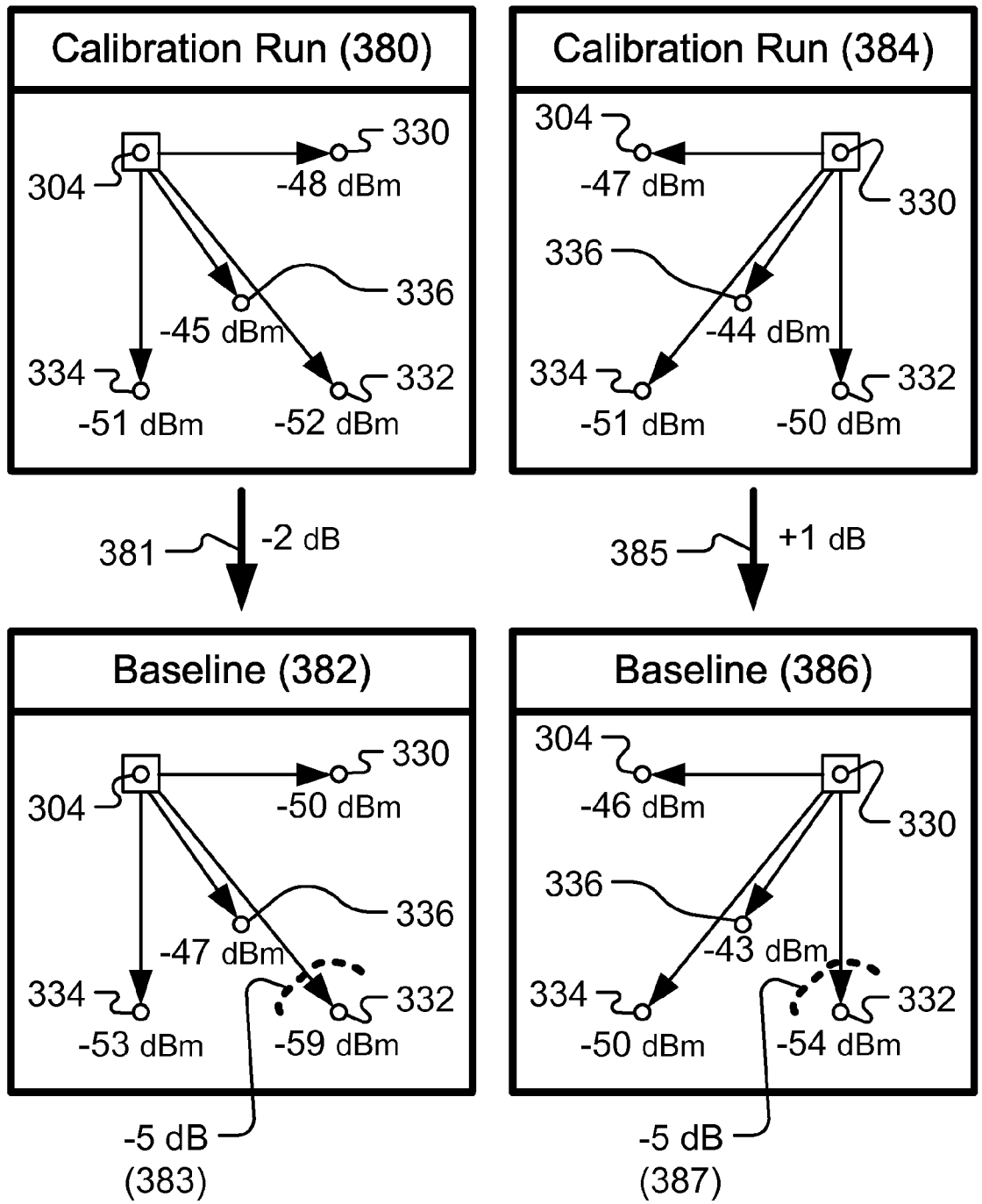
FIG. 3(b) illustrates a hypothetical example of calibration and baseline measurements of output signal power among localized transmitters/transceivers, in an embodiment of this invention.

For a (hypothetical) example in an embodiment, as illustrated in FIG. 3(b), assume that during a calibration run, the values of output signal power level (see Block 380) of transceiver 304 as measured by transceivers 330, 332, 334, and 336, are −48 dBm, −52 dBm, −51 dBm, and −45 dBm. Further assume, the values of output signal power level (Block 384) of transceiver 330 as measured by transceivers 304, 332, 334, and 336 during calibration run are −47 dBm, −50 dBm, −51 dBm, and −44 dBm. Assume that during a baseline measurement at a later time, the output signal power level (Block 382) of transceiver 304 as measured by transceivers 330, 332, 334, and 336, are −50 dBm, −59 dBm, −53 dBm, and −47 dBm, and the output signal power level (Block 386) of transceiver 330 as measured by transceivers 304, 332, 334, and 336, are −46 dBm, −54 dBm, −50 dBm, and −43 dBm. In this example, comparison of the signal power measurements indicates that the power output of transceiver 304 has likely dropped (381) by 2 dB since calibration, and the power output of transceiver 330 has likely increased (385) by 1 dB since calibration. This, for example, can occur due to drift in the transmitter power output over time. The data also indicates that the transceiver 332 consistently measuring 5 dB less than expected when measuring the signal output power of transmitters 304 and 330. This, for example, can occur due to an obstacle (383, 387) blocking the signal received at transceiver 332. Another measurement to confirm this conclusion is the output signal power measurement (not shown) of transmitter 332, by other transceivers and comparing those measurements with those of calibration. In such a case, it is likely that all other transceivers (assuming not individually blocked) would show about the same measured power level drop (e.g., 5 dB) since the calibration of transmitter 332. In one embodiment, the power level measurements from calibration and baseline are compared to determine the transmitters or receivers that are potentially blocked.

In an embodiment, the analysis considers/assumes n number of transceivers (e.g., n=5, in FIG. 3(b)). For each transmitter calibration (e.g., Block 380 or 384), there are (n−1) measurements. Therefore, there are n. (n−1) calibration points for all transmitters power measurements. Likewise, there are n. (n−1) baseline measurements (e.g., Blocks 382 and 386). In one embodiment, the analysis assumes that the transmitted power may drift for each transmitter; and therefore, there are n variables representing power drifts ($D_i$, e.g., expressed in dB, $1 \leq i \leq n$). In one embodiment, the analysis assumes that there may be a blockage close to each receiver which attenuates the received power (as well as the transmitted from the same transceiver). Therefore, there are n variables representing power attenuation due to proximity blockage ($B_i$, e.g., expressed in dB, $1 \leq i \leq n$). One embodiment uses the deviation in power level between the calibration and baseline measurements; therefore, there are n. (n−1) power deviation data points corresponding to the deviation from the calibration data points and the baseline data points. In one embodiment, there are 2n variables representing both $D_i$ and $B_i$ values. This indicates that for $n \geq 3$, with n. (n−1) deviation data points, there will be the same or more number of data points available than the number of variables, providing a redundancy for cross checking or averaging the results. (For example, for n=5, there are 10 variables and 20 power deviation data points.)

In one embodiment, the analysis assumes a blockage between the individual transmitters and receivers (i.e., not specific to individual receivers or transmitters). In an embodiment, the blockage matrix $B_{ij}$ ($1 \leq i, j \leq n$, e.g., expressed in dB) would represent the blockage between the ith transmitter/transceiver and the jth receiver/transceiver. In one embodiment, diagonal terms are set to zero (i.e., $B_{ii}=0$). In such embodiment, there are n. (n−1) variables in the blockage matrix. In one embodiment, the off-diagonal terms are symmetric, i.e., $B_{ij}=B_{ji}$, reflecting an assumption that the signal attenuation is symmetric with respect to the direction of signal propagation between transceivers. In such an embodiment, there are n. (n−1)/2 blockage variables. In one embodiment, there are n number of transmission power drift variables, with $D_i$ representing the power drift for the ith transmitter (e.g., in dB) since its calibration. In one embodiment, there are n. (n−1)/2 blockage variables $B_{ij}$ and n number of transmission power drift variables $D_i$. Therefore, in such an embodiment, there are n. (n+1)/2 number of variables. In one embodiment, there are n. (n−1) power deviation data points (as explained above). Therefore, for $n \geq 3$, there will be the same or more number of data points than variables, providing a redundancy for cross checking or averaging the results. (For example, for n=5, there are 15 variables and 20 power deviation data points.) For n<3, in one embodiment, other estimations, assumptions, diagnostic information (e.g., the input/settings/readings) from transceivers are used to estimate the variables. In one embodiment, given that all the values of power drift and blockages can be increased by same factor without affecting the perceived power measurement, there is an additional normalizing equation (constraint) that would supplement the number of power deviation data points. In another words, the values of the blockage variables and power drifts may be normalized, e.g., based on the smallest blockage value. In such an embodiment, for n<3 (e.g., n=2), instead of just assuming two power drift variables ($D_1$ and $D_2$) and one common blockage variable ($B_{12}$), the additional normalization constraint provides that $B_{12}$ be zero if both $D_1$ and $D_2$ have the different signs (in dB), or one of $D_1$ or $D_2$ be zero if they have the same sign in dB. In one embodiment, the values or allowed/estimated ranges for $D_i$s are determined based on preconfigured values/limits, and/or readings/settings/input to the transceivers. These would provide additional constraint to reflect more accurately the determination of the power drift and/or the blockage in the system.

In one embodiment, if the power output of the local transmitters/transceivers, their receiving antennas and power measurements, and their propagation obstacles are similar, the ratio of measured signal power level (by the other local transceivers) should track as expected with the distance to each transmitter. In one embodiment, a consistent large deviation (e.g., drop) in the power measurement by other transceivers indicate that the transmitter is not working properly or it is blocked by an unusual obstacle. Therefore, in one embodiment, the user is notified via communications from the localized unit to the mobile device (or the vehicle's computer system) in order to notify the user through a user interface (e.g., audio and/or visual) about the issue. In one embodiment, the blocked transmitter is identified to the user by its location on the vehicle, e.g., by matching its identifier with its location using a query on a preconfigured table(s) having the transmitters/transceivers IDs and their installed locations and/or description. Such table(s) is stored/maintained on localized unit, the mobile device, and/or a remote server accessible via the mobile device and/or the localized unit (for example through its own communication device, the vehicle's computer/communication system or the mobile device).

In one embodiment, the blockage variables and/or power drift variables are calculated based on the calibration and baseline data measurements. In one embodiment, the user is notified about abnormal blockage or power drift via a user interface (e.g., on the mobile device or car computer/control system) or by email, SMS, or other communication means/mediums. In one embodiment, identifying data and information are sent from the localized unit to the vehicle computer/control or the mobile device. In one embodiment, if the blockage amount is more than a preconfigured threshold, the user is warned about the blockage and/or its location based on the identity of the transmitter(s)/transceiver(s). For example, the user may be warned that there is an object blocking the transceiver on the right side of the back seat (e.g., 332 in Blocks 382 and 386). Or the user may be warned that there is a blockage, between front passenger and left back seat transceivers (i.e., 330, and 332). This could occur when for example a large metallic object is placed on the front passenger side seat. In one embodiment, if the calculated power drift and/or the amount of blockage are more than their respective thresholds, those measurements affected by the power drift and/or blockage are disregarded when estimating the distance of the mobile device to the transmitters/transceivers. In one embodiment, if the amount of power drift is less than a threshold, the localized unit adjusts (e.g., increases or lowers) the power output setting on the particular transmitter (e.g., in multiple steps with baseline re-measurements). In one embodiment, the statistics of the adjustment and/or power measurements are kept in memory/storage or sent to a server or the mobile device, for further analysis such as identification of degradation in the system.

In one embodiment, the vehicle sensors, such as weight monitoring on seats (e.g., as used to detect a seated passenger), are used to estimate the approximate blockage expected from the passenger(s), or used to check/validate the blockage variables obtained, e.g., from baseline measurements. In such an embodiment, the sensor data may be used directly or via the vehicle's computer system. In one embodiment, the vehicle/sensor status and data is sent to the localized unit or to the mobile device (e.g., after determining that the mobile device corresponds to the vehicle, via e.g., owner, or a family plan).

In one embodiment, the power drift and blockage factors are used to adjust the measured transmitted signal power of the localized transmitters/transceivers at the mobile device. The output power transmitted by the local transmitters/transceivers may be different even during their calibration; therefore, the output signal power of the local transmitters/transceivers (during calibration) measured at some predefined distance(s) to the transmitters (e.g., 2 feet and 4 feet) are used to better estimate the mobile device distance (or relative distances) to the transmitters. For example, in one embodiment, assume that it is estimated that the output power of transmitters 304 and 330 have drifted by −2 dB and +1 dB, respectively (e.g., FIG. 3(b), 381 and 285), while the power output of other transmitter have not changed. Furthermore, assume that there is an estimated blockage of −5 dB (e.g., FIG. 3(b), 383 or 387) associated with transceiver 332. Also, assume that during the calibration, the output power measurement taken from transceivers 304, 330, 332, 334, and 336 at e.g., 2 feet and/or 4 feet distance(s), (by a specialized power meter, or a typical or the same mobile device) provided the following measurements −39 dBm, −38 dBm, −39 dBm, −39 dBm, −34 dBm, at e.g., 2 feet, respectively. Based on the estimated power drift and blockage, the adjusted power levels from transceivers 304, 330, 332, 334, and 336 (measured by the same tools) at 2 feet away from the transceivers would be −41 dBm, −37 dBm, −44 dBm, −39 dBm, −34 dBm, respectively, during the time of baseline measurement.

In one embodiment, as illustrated in FIG. 3(a), when the mobile device is at location 326, it is closer to transceivers 304, 330, and 336, than transceivers 334 and 332 with its separation distance indicated by 340, 342, 350, 344, and 346, respectively. Also, when the mobile device is at location 324, it is closer to transceivers 334, 332, and 336, than transceivers 304 and 330, with its separation distances indicated by 345, 347, 351, 341, and 343, respectively. In contrast, when the mobile device is outside of vehicle, its separation distance to transceiver 336 grows even longer (353). As an example, having the mobile device located at 326, assume the output signal power measurements by the mobile device for the transceivers 304, 330, 332, 334, and 336 are −45.5 dBm, −43.7 dBm, −47.8 dBm, −52.3 dBm, −37.1 dBm, respectively (e.g., during the same time or close the time of the baseline measurement). In one embodiment, the distance of the mobile device to the transmitters is determined by comparing these values with the adjusted power levels (adjusted for power drift and blockage) from transceivers measured at a certain distance (e.g., 2 feet) to the transmitter. For example, in one embodiment, the power ratio is attributed to the separation distance of the mobile device from the transceiver (compared to e.g., 2 feet). For example, in one embodiment, for transceiver 330, the ratio of the local transceiver output signal power measured by the mobile device (e.g., −43.7 dBm) to the adjusted power level (at 2 feet) (e.g., −37 dBm) is −6.7 dB. Attributing this ratio to the spatial attenuation, in one embodiment, the distance of the mobile device to transceiver 304 is determined by $\Delta \text{Attenuation} = -20 \log_{10}(r/r_{ref})$, where r is the distance to the transmitter and $r_{ref}$ is the referenced distance used during calibration (e.g., 2 feet). This estimates that the mobile device is about 4.3 feet. Applying similar procedure, the distance of the mobile device to the transceivers 304, 330, 332, 334, and 336 are estimated to be 3.4', 4.3', 5.5', 5.8', and 2.9', respectively, which places the mobile device close to the driver's seat toward the center line of the car, as demonstrated by FIG. 3(c). For the purpose of illustration, in this figure, the distance from 304 to 330, 336, 334, and 332 was set to 4', 6', 8', and 9', respectively, and 336 was set on long axis of vehicle with each of (304, 330) and (334, 332) pairs arranged symmetrically with respect to long axis.

Figure 3C:
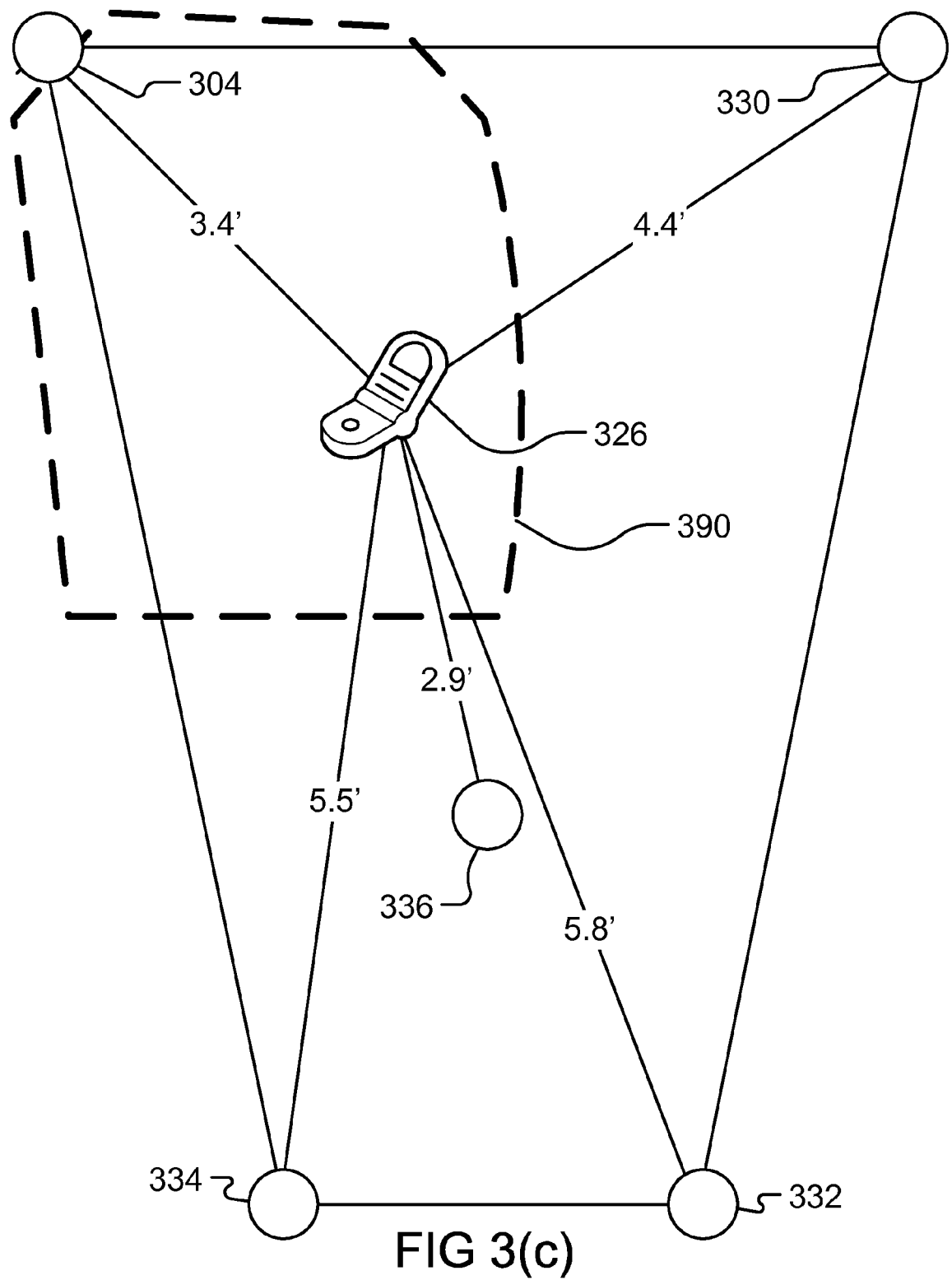
FIG. 3(c) illustrates locating a mobile device via multiple transmitters/receivers/transceivers, used in an embodiment on this invention.

In one embodiment, once the distances of the mobile device are approximated with respect to the local transmitter/transceivers, a triangulation technique is used to map the location of the mobile device compared to features of the vehicle, based on the locations of the transmitters/transceivers with respect to the vehicle (e.g., see FIG. 3(c) and FIG. 3(a)). In one embodiment, by mapping the position of the mobile device, it is determined whether the mobile device is located in certain regions within or close to the vehicle. In one embodiment, the predefined regions are stored as polygons, multi-sided geometrical objects with curved sides (e.g., FIG. 3(c), 390), or free-hand drawn (digitized) geometries, in the same coordinate system as the mapped location of the mobile device. Known mathematical technique can be used to determine whether the mapped location of the mobile device is in a particular region and/or its distance to any similarly defined object. For example, if region 390 is defined to represent the normal reach of the driver in a vehicle while driving, in an embodiment, the mapped location 326 within the region indicates that the mobile device is in a triggering region, and a device feature should be modified (e.g., SMS capability should be disabled).

In an embodiment, the accuracy of locating the mobile device is enhanced by using the same mobile device or similar tool to measure the transmitted output power of the local transmitters/transceivers at certain distance(s) from the transmitters, during the calibration. This is because, in the embodiment, the measured power levels by the mobile device (e.g., at or about the same time as the baseline measurements) is compared with the calibrated values to attribute the deviation to the spatial dependence of the wave form attenuation. If the device(s) used during the calibration phase is different from the mobile device in measuring the transmitted signal power of the transceivers (e.g., due to the antenna size, other calibrations, or internal power gain/amplification), the difference in the power readings between two devices (i.e., calibrating device and the mobile device) can cause an offset in the perceived distance from the transmitter. For example, if the power readings differ by 3 dB (i.e., about twice as much), the offset in the distance estimation would be about 41% ($=10^{(3 \, dB/20 \, dB)}$). Due to the logarithmic dependencies, small deviations in power readings do not significantly impact the distance estimation. For coarse measurements and location of the mobile device within or about a vehicle, in an embodiment, the tolerances can also be applied when defining the triggering regions (e.g., 390), for example, by expanding/inflating its boundaries.

In one embodiment, the power measurements of the transceivers output signal by the mobile device and the calibrating tool(s) are converted to power density measurement, based on the rating and specifications of the measuring tools and device. By normalizing the power values to power densities, in one embodiment, the peculiarities of the measuring devices are effectively masked from the analysis. For example, instead of measure the output power as dBm, in one embodiment, the measured value is converted to, for example, dBm/cm² to reflect the power density. In an embodiment, the measured power densities are similarly adjusted for power drift and blockage estimations. In one embodiment, the transceivers' measurements of other transmitters/transceivers transmitted output signal power during calibration or baseline measurements are also similarly done based on power density.

In one embodiment, the output power transmitted by a local transmitter is estimated by utilizing the circuitry and meters on the transmitter itself. A prior calibration and rating can also be used to estimate the transmitter output power based on the settings and/or input to the transmitter. In such an embodiment, the measurement of the transmitter's output at predefined distance(s) from the transmitter (during calibration) may become optional or require less number of measurements, as an alternative way to measure and monitor the transmitter's output power is provided by the transmitter itself. In an embodiment, the output power levels (and/or the settings and input parameters) of the transmitters/transceivers are stored during the calibration phase. In one embodiment, the transmitted signal output power of a transmitted is converted to a power density value at a given distance (e.g., 2 feet) from the transmitter based on the type of the transmitter and/or known or estimated theoretical/empirical power density vs. distance relationships.

Figure 3D:
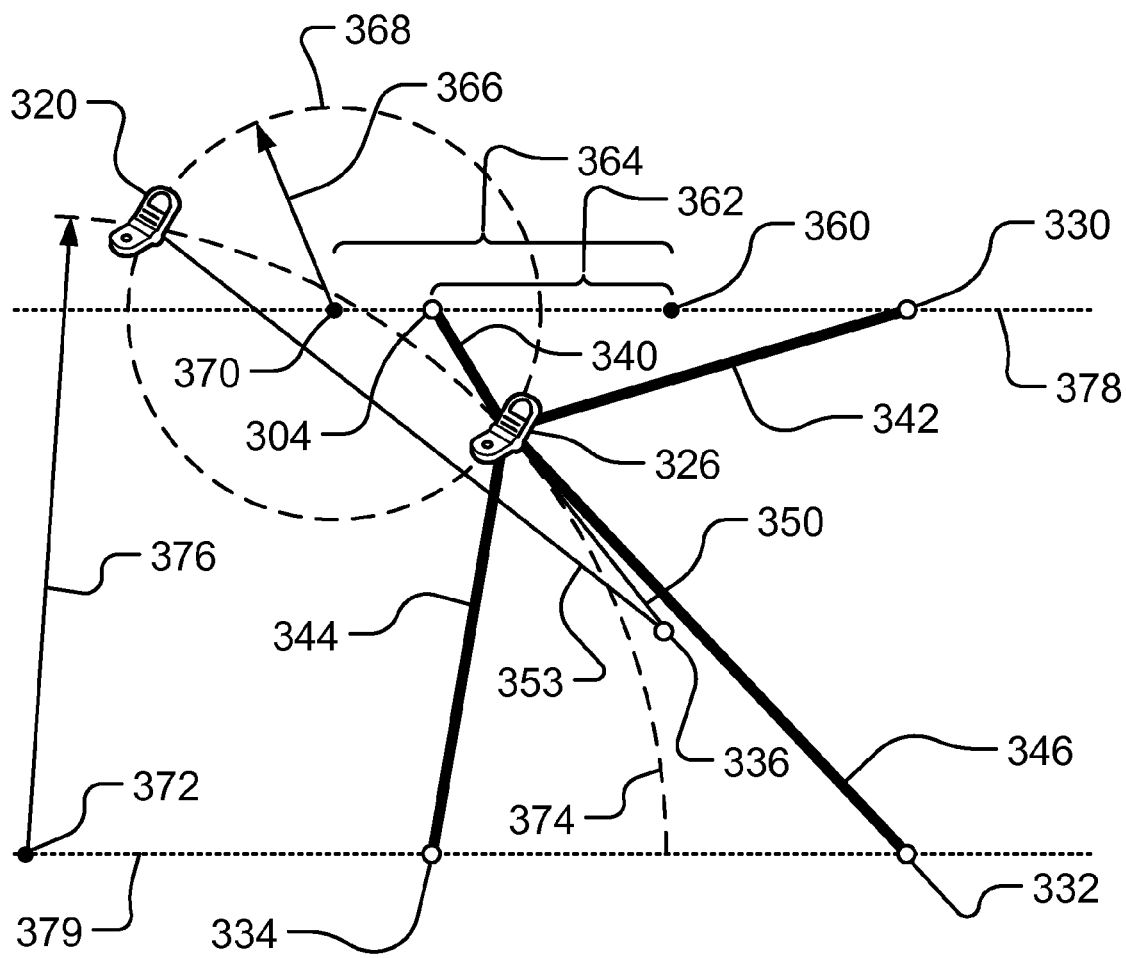
FIG. 3(d) illustrates locating a mobile device via multiple transmitters/receivers/transceivers, used in an embodiment on this invention.

In one embodiment, the mobile device distances to the local transmitters are estimated based on the power ratios received from multiple local transmitters. In one embodiment, as illustrated in FIG. 3(d), the distance of the mobile device (at 326) to transmitters/transceivers 340, 330, 332, 334, and 336, is indicated by 340, 342, 344, 346, and 350, respectively, and the output signal power levels transmitted from the transmitters/transceivers to the mobile device depend on the respective distances. In one embodiment, the measured power levels are adjusted for estimated power drifts in the transmitters and/or blockages, as described earlier. In one embodiment, the power level measurements are normalized to power densities at the mobile device and/or calibrating device(s). In one embodiment, the transmitters/transceivers output power is determined, e.g., by a prior calibration or by using the transmitters circuitry/settings/input. In one embodiment, the measured power (or power density) of each transceiver at the mobile device is corrected/normalized using the determined the transmitters/transceivers output power. This correction/normalization estimates the power levels as if the transceivers had the same output powers, therefore, in an embodiment, the normalized measured power (or density) level is expressed in dB. In one embodiment, the adjustment and correction factors are applied to the transceiver's transmitted power level (or power density) as measured by the mobile device. In one embodiment, the variations (e.g., ratios) in values of the corrected/adjusted power readings at the mobile device are attributed to the spatial attenuation of the wave form transmitted to the mobile device from the local transceivers. Therefore, in an embodiment, the ratio of the corrected/adjusted power (or power density) from two transceivers are dependent on the distances to those transceivers. In one embodiment, the dependency is logarithmic, and for example, it is expressed as $(P_{c2}/P_{c1})=-20\ LOG_{10}(r_2/r_1)$ (in dB), where $P_{c2}$ and $P_{c1}$ are corrected/adjusted power (or power density) measurements at the mobile device from transmitter 1 (e.g., 304) and transmitter 2 (e.g., 330), respectively, and $r_2$ and $r_1$ are the mobile device distance to the transmitters (e.g., 340 and 342, respectively). If expressing the normalized powers in dB, in an embodiment, the relationship becomes $\Delta p_{21}=-20\ LOG_{10}(r_2/r_1)$ (in dB), where $\Delta_{21}$ is the difference of the corrected/adjusted power (or power density) levels expressed in dB. In an embodiment, the ratio of the distances from a mobile device to two transmitters are determined, e.g., based on $r_2/r_1=10^{\wedge}(\Delta_{21}/-20\ dB)$. (Note that a^b indicates a to the power of b). Therefore, as an example illustrating an embodiment, assume the measured output signal power from transceivers 304 and 330 (FIG. 3(d)), at the mobile device are −45.5 dBm and −43.7 dBm, respectively, and also assume that since the calibration, the transmitted power drift ($D_i$) of the transceivers were −2 dB and +1 dB, respectively. In addition, assume that output power of the transmitters (during calibration) were −0.2 dBm (0.95 mW) and 0.8 dBm (1.20 mW), respectively, (or assume that the measured power at e.g., 2 feet distance during the calibration were −39 dBm and −38 dBm, respectively). Therefore, the measured power levels are adjusted to −43.5 dBm and −44.7 dBm (to pre-power drift levels), respectively. The adjusted power levels are normalized to take into account that the output power (at calibration) of the transmitters were different by 1 dB (=0.8 dBm−(−0.2 dBm)=−38 dBm−(−39 dBm)). For example, normalizing/correcting relative to transmitter₁, the corrected/normalized power levels would become −43.5 dBm and −45.7 dBm, for transmitter₁ and transmitter₂, respectively. Alternatively, to normalize, the ratio of the (adjusted) power levels to the calibrated power output of the transceivers or (the calibrated power measurement at e.g., 2 feet from the transmitters) may be taken. The results will be the same in this example, because the normalization results in a relative correction of 1 dB. Then, the ratio of the corrected/adjusted output signal power levels (i.e., $\Delta p_{21}$) for two transmitters (304 and 330) as measured by the mobile device becomes −2.2 dB (=−45.7 dBm−(−43.5 dBm)). Therefore, the distance ratio to the transceivers become $r_2/r_1=10^{\wedge}(-2.2\ dB/-20\ dB)=1.29$. This is the same ratio of the distance from the mobile device (326) and the transceivers (304 and 330) as illustrated in FIG. 3(c), i.e., $r_2/r_1=4.4'/3.4'=1.29$.

In one embodiment, the location of the mobile device is determined by using the calculated ratio of the distances of the mobile device to the transmitters/transceivers. For example, as illustrate in FIG. 3(d), the locus of points on the plane (or in 3 dimensional space) having the same ratio (k<1) of distance to two fixed points (e.g., 304 and 330) is a circle (e.g., 368) (or a sphere in 3D), with its center (370) located along the line (378) joining two fixed points (304 and 330) and located at a distance (364) $l_c$ from the midpoint (360) of the segment joining the fix points (304 and 330). The center of circle is outside of the segment joining the fixed points and it is closer to the one (304) whose distance to any point on the circle (368) is smaller than that of the other fixed point (330) (i.e., length of 340<length of 342). If a (362) denotes the distance of the fix points (304 or 330) to their segment midpoint (360), the radius R (366) of circle 368 as and its location of its center $l_c$ (364) are given by:

$$R = a \cdot \sqrt{\gamma^2 - 1}$$

$$l_c = a \cdot \gamma$$

Where $$\gamma = \frac{1+k^2}{1-k^2}$$

Note that since here k<1, then γ>1 and a<$l_c$ and 0<$l_c$−R<a.

In special case where the distant ratio is 1, both $l_c$ and R tend to infinity, as γ tends to infinity and k tends to 1. In this case, the locus of points having same distance to the fixed points simple becomes the perpendicular bisector of segment joining the fixed points.

Similarly, the ratio of distance of the mobile device (326) to another pair of transceivers (e.g., 332 and 334 pair) is used to determine the corresponding locus of points having the same distant ratio to the fixed points (332 and 334). The locus of these points, as depicted in FIG. 3(*d*), lie on a circle (374) having a center (372) on a line (379) joining the fixed points (332 and 334) and a radius (376).

In one embodiment, intercepting a circle (e.g., 368) associated with a pair of transceivers (e.g., 304 and 330 pair) with another circle (e.g., 374) associated with another pair (e.g., 334 and 332 pair) narrows and limits the possible locations (e.g., 326 and 320) of the mobile devices with respect to the transceivers, as the intercept points of the circles. For example, considering 4 transceivers (FIG. 3(*d*): 304, 330, 332, and 334), there are 3 pairs of independent power ratios, and three independent circles. For example, two of the three independent circles could be 368 and 374. The third circle could be associated with any of the remaining pairs (304, 334), (332, 330), (334, 330), or (304, 332). The third circle associated with any of the third pairs would limit the location of the mobile device to one of 326 and 320. An additional transceiver (e.g., 326) would provide additional power ratio (with any of the other transceivers) and would provide an additional independent circle (associated with it and one of the other transceivers), which potentially validates the determination of the location of the mobile device based on 4 transceivers. In one embodiment, the independent circles are identified by numbering and sequencing the transceivers, and selecting (i, j) pairs where i<j and i and j are associated with ith and jth transceivers. In an embodiment, the transceivers are sequenced and numbered based on their corresponding transmitted output signal power measurements at the mobile device, so that the generated intercept points more accurately reflect the potential locations of the mobile device. In one embodiment, more weight is given to the circles associated with pairs of transceivers having higher combined power measurements at the location of the mobile device. In one embodiment, the weight is expressed in dB, while in another embodiment, the weight is expressed in linear scale (e.g., mW), in order to drastically reduce the weight of the pairs having one (or both) transceiver whose signal power level measured at the location of the mobile device is relatively low.

In one embodiment, a hybrid approach is taken to determine the location of the mobile device. For example, two (or three) circles associated with two (or there) transceiver pair are intercepted to determine a narrowed potential locations for the mobile device. Then, a transceiver (e.g., 336) is used to determine the distance to the mobile device using a power level approach. This way, for example, one embodiment discriminates between the potential locations of the mobile device (e.g., 326 and 320) by comparing the estimated (based on power level) distance from the mobile device to the transceiver (336) to the distances (350 and 353) from the transceiver (326) to the potential locations (326 and 320, respectively) of the mobile device.

In one embodiment, the power levels (or density) transmitted by the local transceivers are mapped for each transceiver on and/or around vehicle, e.g., by using actual measurements during calibration, empirical results, simulation, and/or estimations, with/without passengers or with different arrangements of passenger seating. Based on this power level mapping, a set of contour maps are generated to reflect a loci of points having the same ratio of the power (or density) between the two transceivers (pair) for a set of ratios (e.g., expressed in dB). Then, in an embodiment, the contours are used to map, e.g., by interpolation or extrapolation between contour lines, to determine a contour representing the determined distance ratio corresponding to the transceiver pair. Then, in one embodiment, such interpolated/extrapolated contour lines from multiple transceiver pairs are superimposed to determine their intercept points as potential location of the mobile device. In previous examples, the contour lines were represented by intercepting circles. In one embodiment, the location of the mobile device is estimated as an average location of a cluster of intercept points that are closely located with each other. In one embodiment, if the contours (or circles) do not actually intercept, a stand-in pair of intercept points which define the shortest segment connecting the contours (or circles) are used instead.

Similarly, in one embodiment, the signal power levels are measured and calibrated under various occupancy of the vehicle and this data is used later to determine the location of the mobile device by looking up the determined power levels/ratios in the gathered data and performing interpolation/extrapolation on the gathered data points.

In one embodiment, for example using BLUETOOTH® (A wireless technology protocol) or similar technology, for establishing the transceiver rangers (e.g., 102) or used to locate the mobile device within a vehicle (e.g., FIG. 3) based on the transceiver's output power level, the output power level of the transceivers are prevented from varying during the communication setup with the mobile device, or they are set back to their original calibrated levels for the purpose of establishing range(s) and determining distances from the mobile device.

Generally, when a transceiver attempts to participate in a power-controlled link with another transmitter, it needs to measure its receiver signal strength and determine if the other transmitter should modify its output power level. This is achieved for example via Receiver Signal Strength Indicator (RSSI). The instructions for modifying the transmission power are provided by the LMP (FIG. 12, 1206). Therefore, in one embodiment, the transceivers are modified to not change their output power level due to such requests from other transceivers, or alternatively, store their calibrated setting and restore to those settings before performing their baseline measurements or providing a limited range to the mobile device. This modification may be done by configuration, additional software hooks to modify/supplement the code behavior, or additional logic at the RF power control module to determine if it should respond to request for power level change.

In one embodiment, directional transceivers/transmitters are used to tailor the ranges (e.g., 102) and coverage. Due to its angular dependence of their signal power, the distance of the mobile device to the transmitter may not be accurately estimated in all directions only based on the measured power level measured at the mobile device. In one embodiment, the transmitted power is lowered to limit the size of range. In one embodiment, overlapping (directional) ranges are established (e.g., in a checkerboard pattern) by multiple transceivers, so that by identifying which transceivers cover the mobile device, it is effectively determined in which overlapped portion of the corresponding ranges, the mobile device is potentially located.

In one embodiment, as illustrated in FIG. 7, the Localized Unit (702 and 752) is includes the transmitter/transceiver. In other embodiments, the localized unit is not tightly integrated with the transmitter(s)/transceiver(s), e.g., because of the physical installation/location and/or size.

As shown in FIG. 7, in one embodiment, the modification of the feature of the mobile device (704, 754), is affected by one or more contextual/environmental variable/parameter/ signals, such as the status of the vehicle (760) (or a subset thereof).

Figure 8:
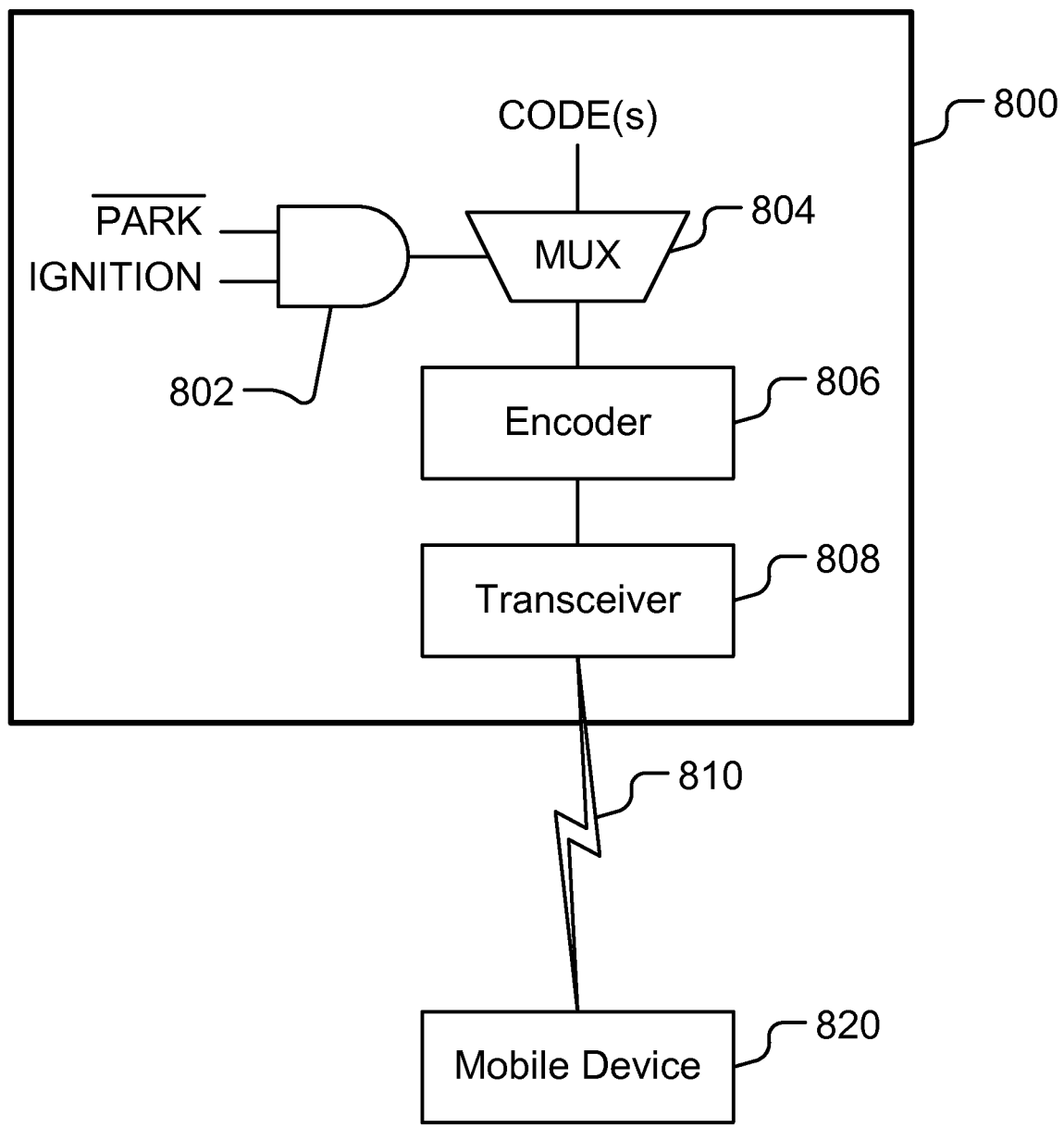
FIG. 8 illustrates a schematic of communicating a code to a mobile device based on, for example, a vehicle's status, in an embodiment of this invention.

FIG. 8 shows an example for illustrating this concept, in an embodiment of this invention (however, any codes or similar input can also be used, as a substitute). As illustrated, for example, "not-PARK" variable/signal/input is AND-ed (802) with IGNITION variable/signal/input, and the (logical or physical) result is used to select among multiple codes (804), for example, via a logical or a physical multiplexer (MUX). In one embodiment, code(s) are universal codes or unique codes, e.g., predefined, for feature activation or deactivation tasks. Another code for identification of transmitter/transceiver or vehicle can be sent separately or in combination with the code(s) mentioned above at 804, e.g. added, concatenated, or mixed/coded together. In one embodiment, the localized unit (of 752) is represented by the system shown at 800. In this embodiment, units 806 and 808 are integrated within 800. However, they can be separated, as located outside of system 800, in another embodiment. The system 800 communicates (810) with mobile device (820) wirelessly or via a connection through a wired network, cradle or a plug. In the logic demonstrated by FIG. 8, the feature modifying code (which triggers the modification of the feature at the mobile device), is sent to the mobile device when the vehicle is on (ignition is on) and the vehicle is not in PARK mode (e.g., in Drive gear). This logic may be implemented in software, firmware (e.g., FPGA), and/or hardware (e.g., ASIC) within localized unit and/or transceiver(s) in an embodiment of this invention. In one embodiment, the car status is sent from the localized unit and/or transceivers to the mobile device and the above logic is implemented in the mobile device by a program running on the mobile device. Similarly, in one embodiment, the vehicle status may be communicated to a remote server/service (via for example vehicle's communication system, localized unit communication system, or the mobile device) and similar logic is performed by a remote entity/server, followed by the mobile device receiving a notification from a remote entity/ server (directly or via computer system in vehicle or localized unit) whether to modify a feature on the mobile device or take other actions.

In an embodiment, other or additional vehicle status (e.g. speed), road status (e.g., rainy), passenger status, and/or information (e.g., from vehicle's sensors such as outside lighting) are used to send an appropriate code to the mobile device. In an embodiment, where only one code is sent to the mobile device (e.g., indicating modification of a feature), logically or physically, the selection step (e.g., via MUX (804)) may be implemented differently or eliminated.

Figure 9:
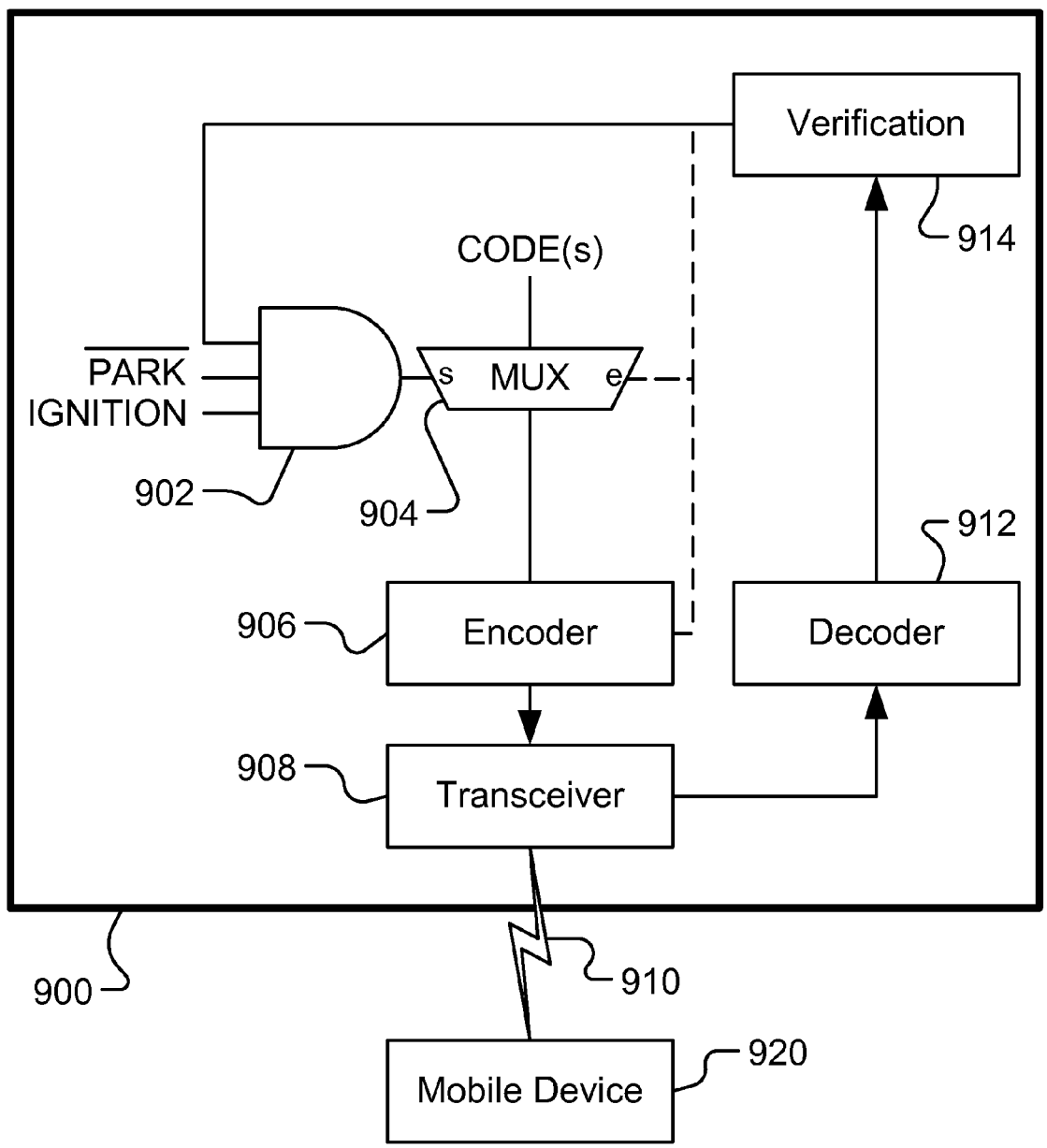
FIG. 9 illustrates a schematic of communicating a code to a mobile device based on, for example, a vehicle's status and the validation of a code from the mobile device, in an embodiment of this invention.

Similarly, as shown in FIG. 9, in an embodiment, system 900 (e.g., representing a localized unit) communicates (910) with the mobile device by sending one or more codes. In this embodiment, the mobile device (920) communicates with a transceiver (908) in its range, sends the system (900) a code (e.g., indicating that a mobile device is capable of modifying its feature). Upon receiving the signal/message by the transceiver, the message is decoded (912) and the transmitted code is verified by the system (914) to check for the validity of the received code, e.g., using a preconfigured stored code(s). Based on the verification, the code(s) (e.g., feature modification/activation indicating code(s), e.g., as discussed earlier in context of system 800) is sent to the mobile device based on car status/parameters/sensors (e.g., whether the vehicle is out of PARK and (902) the engine is on). The lines (solid and dotted) from Verification module (914) to the logic (902), code selection (904), and Encoder (906) indicate some of multiple ways that the system can be implemented in various embodiments in order to send the feature activation/deactivation code(s) after the system has already received and verified the initial code from the mobile device. For example, Verification module can effectively nullify the logic (e.g., by sending a logic "0" to an AND gate (902)), disable the code selection unit/process (e.g., by disabling MUX (904)), and/or disabling/preventing Encoder (906) or Transceiver (908) to receive the code(s) in the first place (e.g., by modifying the output at their previous stages (904 or 906)). In an embodiment, Verification module can similarly enable these modules/processes when the verification is successful, e.g., by sending a logic "1" to the logic module (902), enable code selection module by enabling MUX, enabling Encoder (906) to receive selected code, and/or modifying the output at stages at 904 or 906 (as indicated by dotted lines in FIG. 9). FIG. 9 is provided for illustration purposes of the concept, as there are multiple ways to implement such embodiment known to one skilled in the art.

In one embodiment, the mobile device sends a message to a remote server/service when modifying a feature. For example, in one embodiment, when disabling SMS feature on the mobile device, the mobile device sends a message to SMSC to store (i.e., to hold) the incoming messages, until the hold is removed, e.g., by sending another message to SMSC to forward the messages to the mobile device.

Figure 10:
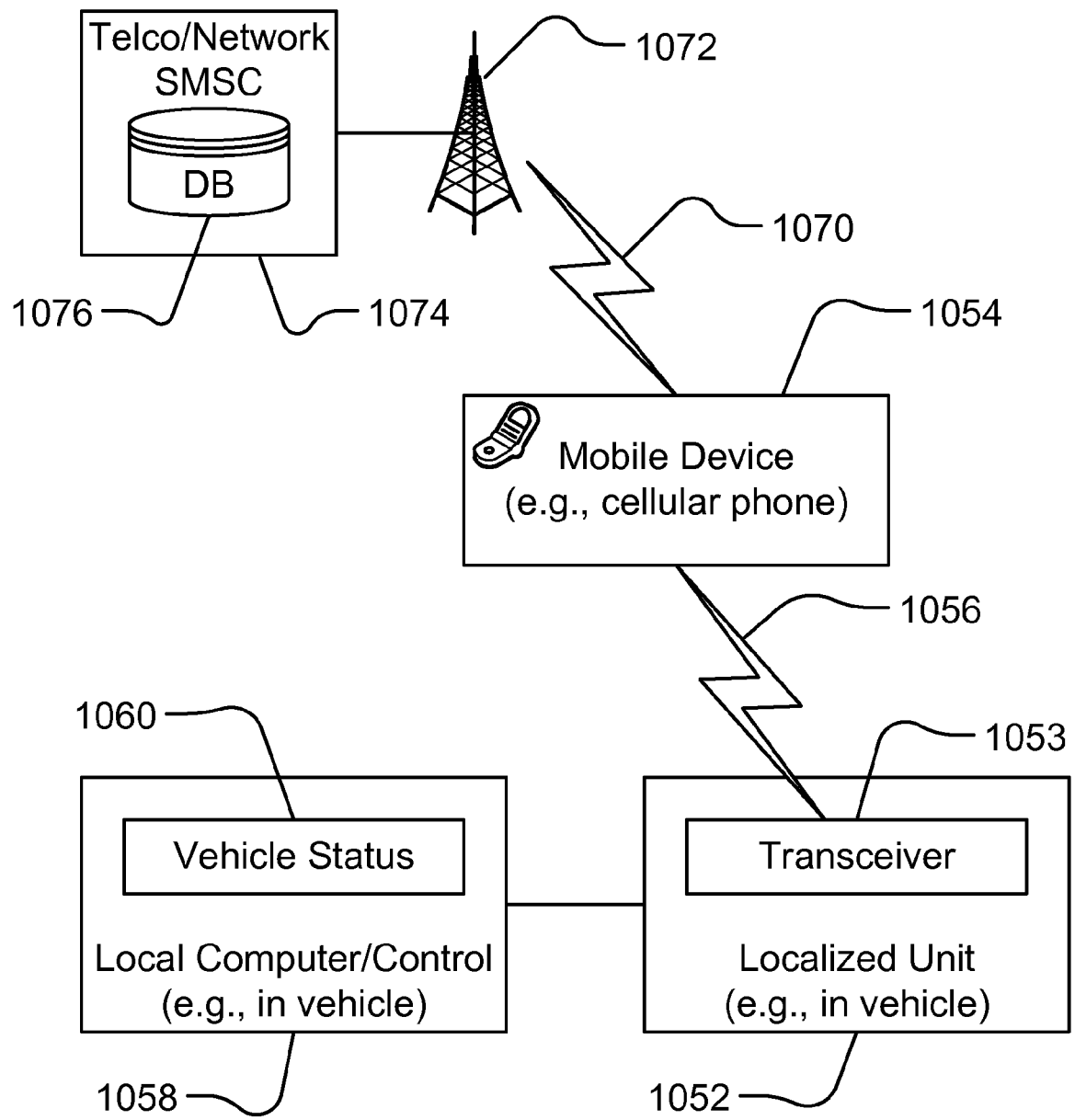
FIG. 10 illustrates a communication path between a local computer/control (e.g., in a vehicle), a localized unit, a mobile device, and a SMSC, in an embodiment of this invention.

FIG. 10 illustrates an embodiment where the mobile device (1054) communicates, for example, with Telco (1074)/network/SMSC and/or its database/remote service or server (represented by 1076), for example through an intermediate cell phone tower antenna 1072. In one embodiment, when a feature of the mobile device (e.g., SMS) is disabled, a message is sent to 1074 to indicate this change. For example, in one embodiment, a message is sent to SMSC to indicate that the mobile device (1054) should not receive SMS. This indication/flag is stored and maintained at SMSC (1074) and/or a corresponding database (1076). In one embodiment, the indication to disable/limit the feature is stored/linked/associated with other information, such as the vehicle ID/localized unit identification/transceiver's identification. In one embodiment, additional information about the car, 1st telephone, 2nd telephone, transfer rules (e.g., FIG. 5), forwarding rules, family plans and their connections together for conference calling or forwarding the calls/text messages, storage schemes and plans, delay plans for storage and forwarding the message/ text, configurations, parameters, logical and conditional rules and statements, information about passengers, and/or similar information are stored at and accessed from DB (1076). The database (1076) and all the data above can be distributed in one or more databases, or at one or more locations, and offered by one or more businesses, independently.

In one embodiment, the communication can go between 1058 and 1074 (or between 1074 and 1052), instead of (or in combination with) communication between 1054 and 1074.

Figure 5:
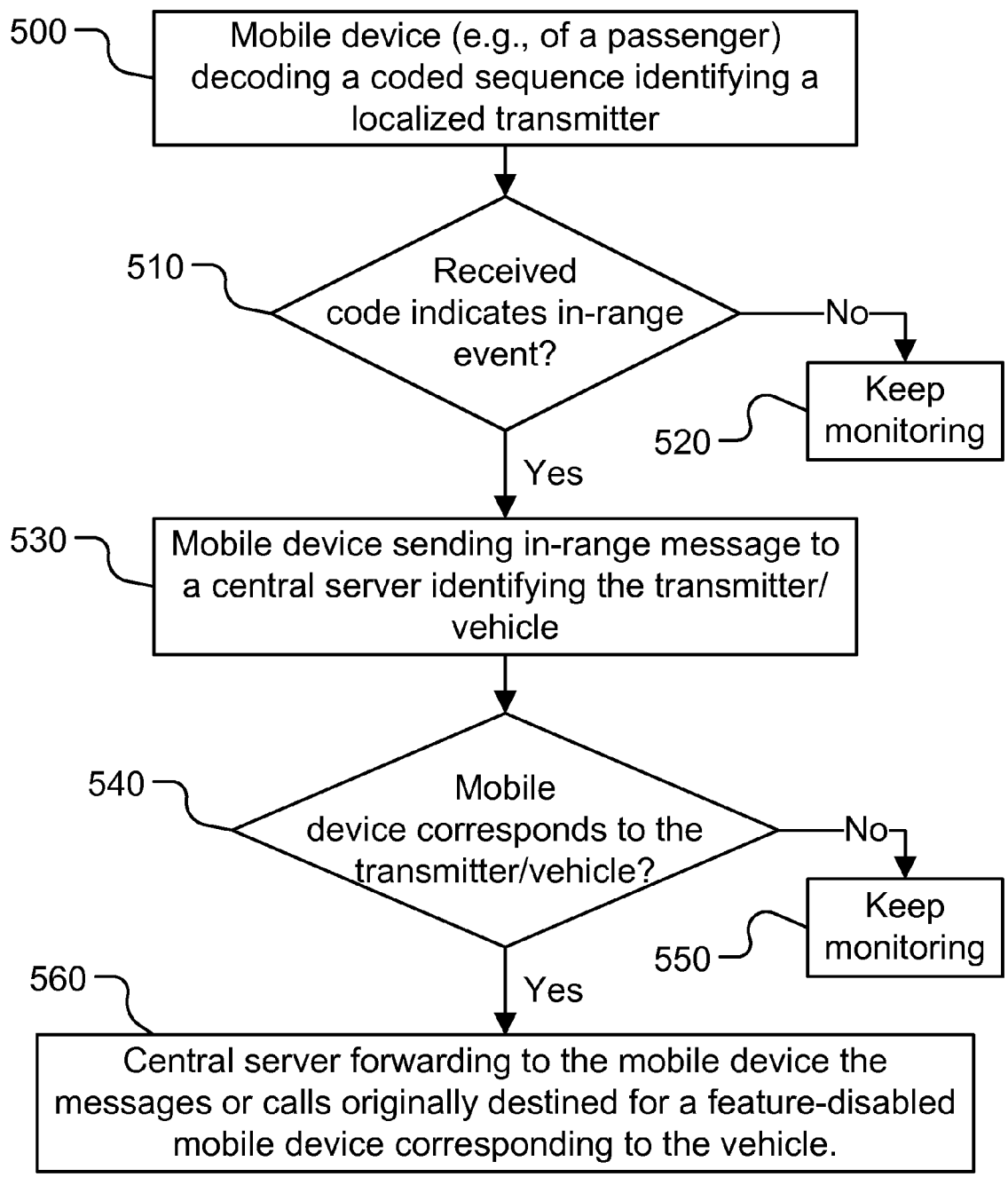
FIG. 5 illustrates steps in forwarding messages or calls to a mobile device in an embodiment of this invention.
Figure 6:
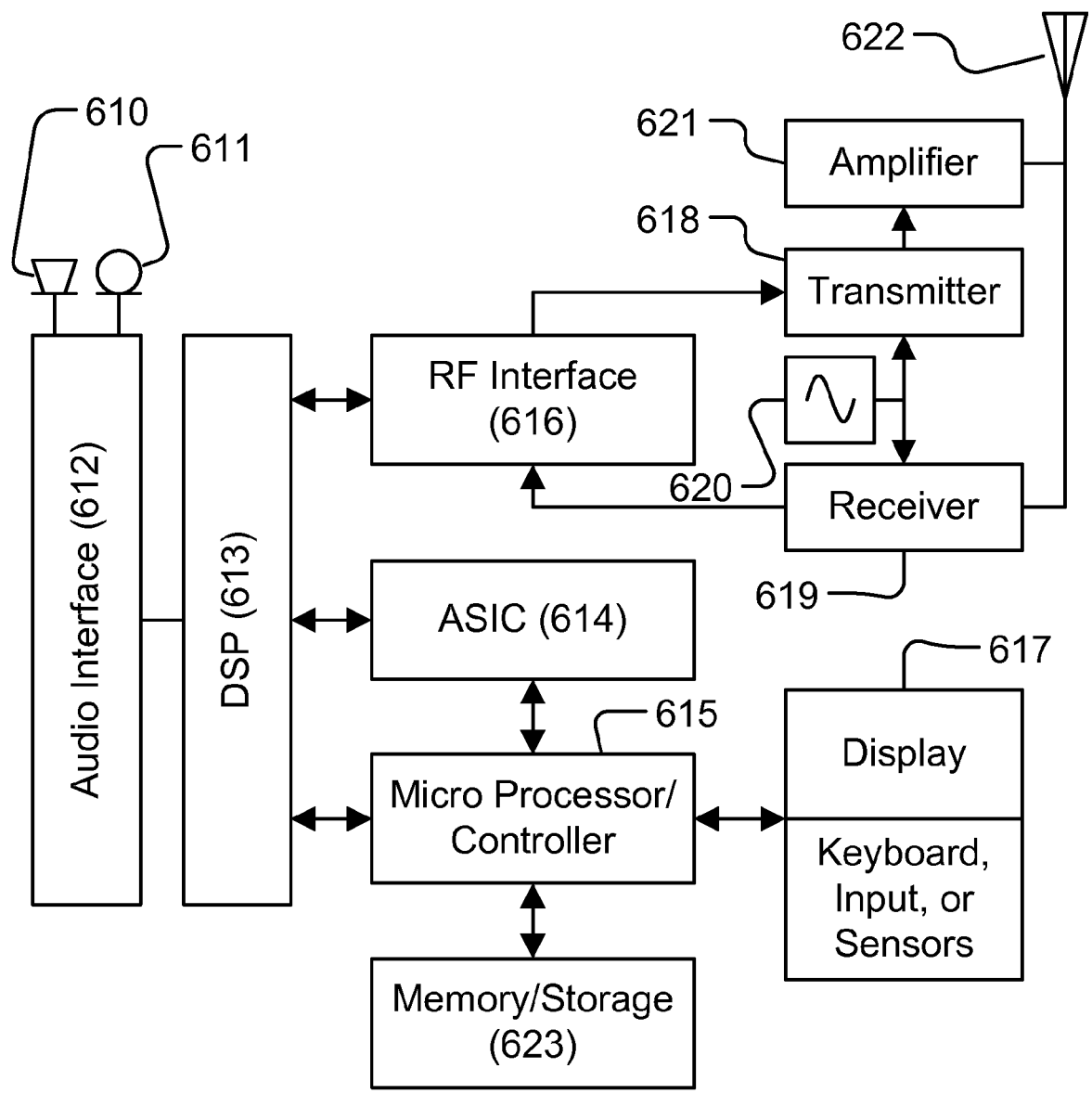
FIG. 6 illustrates typical components of a mobile device, known in prior art.

FIG. 5 illustrate steps related to an embodiment with multiple mobile devices (e.g., cellular phone), corresponding to, for example, the driver (FIG. 2, 226) and one or more passenger(s) (222 or 224), for example, occupying seats 212 and 214 (or 216), where one of the methods of this disclosure is used to determine that each mobile device is within a range of, for example, deactivation/disabling/modification (202) or activation/enabling/in-range (231), so that, for example, the SMS functionality in the first mobile device (e.g., 226) gets modified/disabled and the SMS function or messages/calls is forwarded to the second mobile device (e.g., 222), so that the mobile device at 222 is enabled to do the same function, by the passenger on seat 214 (instead of by the driver at 226).

In one embodiment, a first mobile device (e.g., 202) functionality is limited/disabled/modified due to its entrance in effective range of transceiver 204 (close to the driver's side). As the result a message is sent to, for example, a remote server/service/SMSC to flag the first mobile device as modified featured. In addition, the vehicle/transceiver ID associated with the first mobile device is also sent and stored at the remote service (e.g., in a database), as described earlier. As shown in FIG. 5, in one embodiment, a second mobile device (simply denoted as mobile device in FIG. 5, 500), for example, located at (222) receives a code from a local transceiver (e.g., 230) and determines that it indicates an in-range event (510), i.e., the second mobile device (222) is in effective range (231) of transceiver 230 (or it is determined that the second mobile device is located at or near the front side passenger seat (214)). In one embodiment, the mobile device sends (530) a message to (for example) the remote service/center/server/SMSC, identifying the second mobile device, the vehicle/transmitter ID (230), and in-range event (or its availability to assume another mobile phone functionality/feature). In one embodiment, the remote service (or SMSC) attempts to match the first mobile device with the second mobile device. For example, in one embodiment, the remote service queries the vehicle ID to find matching mobile device(s) that are currently have modified-feature attributes (e.g., by looking up a database). In this example, the query result would include the first mobile device as it was tagged as feature-modified and it was linked (e.g., by an entry in a database) to the unique vehicle/transmitter(s) ID. In one embodiment, it is determined that both first and second mobile devices are associated with the same vehicle. In one embodiment, the remote server (or the first mobile device) determines whether the $2^{nd}$ mobile device can assume the modified/limited functionalities/features of the first mobile device. As an example, a predefined table is queries that provide the identities of the mobile devices having such authorization. An example would be a set of mobile devices that belong to a family plan or a business plan, etc. In one embodiment, the service provides an interface for users to configure/update/maintain the list. If the second mobile device can stand-in for the first mobile device (e.g., per list), then the second mobile device corresponds to the correct vehicle (540), and the remote service (or SMSC), e.g., forwards the text messages that were destined to the feature-modified mobile device (i.e., the first mobile device) to the stand-in mobile device (i.e., the second mobile device) (560).

Similarly, in one embodiment, the status of each mobile device (e.g., 226 and 222) are determined, and the function or message tasks are forwarded to 222, by the central server. Mobile device 226 is deactivated, partially or fully, e.g. at least for the functions that were forwarded to mobile device 222. The identification steps are done at steps 500 and 530, and the decision steps are done at steps 510 and 540, with decisions to keep monitoring at steps 520 and 550, and final step of forwarding the tasks at step 560.

In an embodiment, where one mobile device is shared between the driver and one or more passengers, (e.g., a mobile telephone belongs to the driver originally), and it is within the feature deactivation/disabling range of the driver seat, as determined by any of the methods mentioned in this disclosure, such as using items 204 and 230 for transmitter/transceiver (as an example), or ranges 202 and 231, for the driver and passenger, and a mobile device, e.g., item 226 in FIG. 2. However, when the phone is given to a passenger, in another seat, e.g., moving from seat 212 to seat 214, the signal goes to the center, a server, or SMSC, to update that the phone is now within an activation/enabling range, for the current location, to update the status to the activated or enabled device. Then, the passenger can use the feature, e.g., act on it and talk or text on the phone, back and forth.

In one embodiment, when the phone moves back, from range 231 to range 202 (e.g., handed from a passenger on seat 214 to the driver on seat 212), then a message is sent to the center, a server, or SMSC, to update that the mobile device (e.g., a cellular phone) is now within a feature deactivation/disabling range, and thus, the system does not let the driver use e.g., the texting functionality from then until the situation changes again, in the future.

In FIG. 11, there are some examples of communications, notification and/or forwarding from one device (or another device, or more devices, or in combination). However, these can be generalized to any number of proxies or intermediate devices, for storing, notification, forwarding, instructions, rules, controlling, and replacing. The SMSC can be generalized to any server, central place, or any other data center/processing center.

Figure 11A:
FIG. 11(a)-(d) illustrate interaction between a local device (e.g., in a vehicle), a mobile device, and a feature server/entity (e.g., SMSC) in an embodiment of this invention.

FIG. 11(a) shows one embodiment of the local device or localized unit (752) (maybe, located in the car, for example) sending a code to the mobile device, which, in turn, sends a Halt signal to SMSC, to stop sending any message or text, for example, to the user.

Figure 11B:

FIG. 11(b) a local device (e.g., car communication system) acts as a proxy, and takes over. (The mobile device sends a proxy message to the local device.) Then, the local device acts as an intermediate device, and sends a Halt signal to SMSC.

Figure 11C:
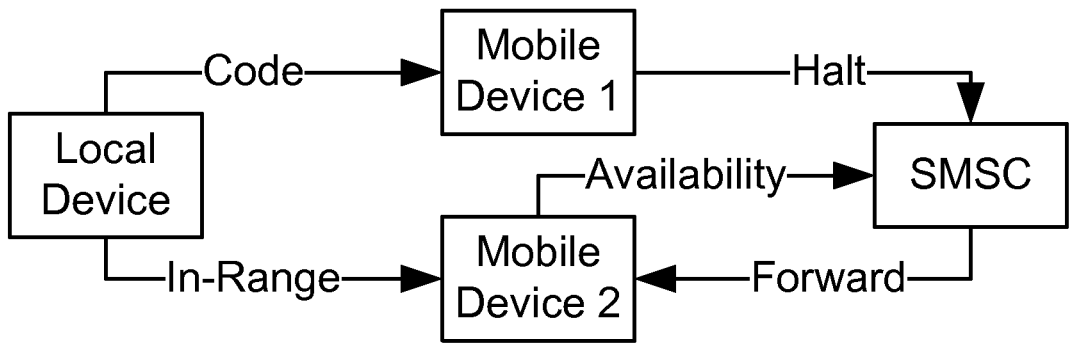

In FIG. 11(c), we have multiple mobile devices, for the same local device, for which the availability of the second device is announced by the 2nd device, directly to SMSC, and the function for device 1 is halted, by the Halt message from device 1 to SMSC. Then, the message/function is forwarded to the second device, from SMSC.

Figure 11D:
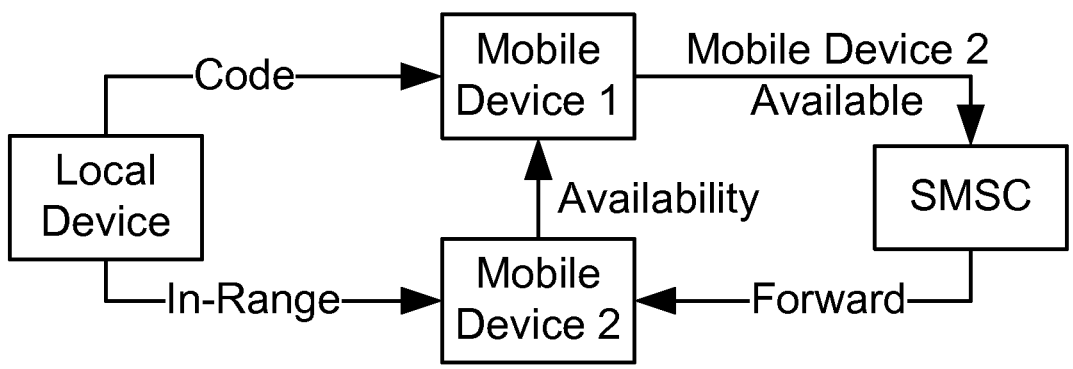

In FIG. 11(d), we have multiple mobile devices, for the same local device, for which the availability of the second device is announced by the 2nd device to the device 1, which will notify SMSC about the availability of device 2 (indirect notification to SMSC, in contrast to FIG. 11(c)). Then, the message/function is forwarded to device 2, from SMSC, instead of device 1. (The code transmission and in-range verification are already taught by other examples in this disclosure.)

Note that the teaching in this disclosure also applies to any wavelength, RF, infrared, X-ray, microwave, radio waves, laser, other parts of electromagnetic spectrum, visible, or invisible parts, plus sonar, radar, Doppler effect, sound waves, shock waves, or ultrasound waves. In one embodiment, an array of antennas is located on the top of the roof of the car, or inside the door of the car. The teaching in this disclosure also applies to the reflection, transmission, refraction, or emission, by/from/deflected by/through antennas, objects, human, users, drivers, passengers, telephones, tags, smart cards, IDs, RFID, or mobile devices, either active or passive (no battery or power, for example), and detected or received by some other dishes, antennas, detectors, sensors, CCDs, sensitive films, sensitive transistors or diodes, recording media, storage media, counter, accumulator, lenses, or semiconductor layers, to find/determine the location of users, telephones, and other objects, in the car or at other places.

In one embodiment, the sensor/transceiver or multiple sensors/transceivers are placed in a vehicle (moving object, or any object, in general). In one embodiment, the RFID (active or passive) technology is used, and RFID transceiver(s) are placed at the steering wheel, dashboard of the car, roof, door(s), mirror (center one, or on the side of the car), sunvisors, or other locations in the car. In one embodiment, the one or more sensors or detectors are placed near the driver or closer to the driver of the car. In one embodiment, a range threshold (e.g., FIG. 1, 102) is the maximum effective length/distance of the operation for this current device/system (or sensors) (i.e., within the range of operation of this current invention). In one embodiment, the mobile device is equipped with RFID transceiver/tag.

In one embodiment, an array of antennas is used, to make the signal directional. In one embodiment, the transceivers are placed at the ceiling of the vehicle or close to the floor (e.g., under the seats).

In one embodiment, the driver is excluded, but others on the car are not excluded, to perform a task (or have an option or functionality on the mobile device) or send/receive some signal or information. In one embodiment, some locations in the car are designated as hotspots, to be excluded, or to be included, to perform a task or receive some signal or information. In one embodiment, some locations in the car are designated as hotspots, in combination with a context (for example, the type of message, the sender, the identity of the receiver, the time of the message, the length of the message, or the content of the message, such as Private Message, Emergency Message, Financial Message, or "For The Person Named Joe Smith Message"), to be excluded (e.g. cannot do it), or to be included (e.g. can do it, or vice versa), to perform a task (or receive some service) or receive some signal or information.

Note that "can-do-it" situation can be generalized to all these situations. The user (limiting in terms of time or number of functions and tasks):
 can do it,
 or partially do it,
 or with limited option do it,
 or sometimes can do it,
 or conditionally can do it,
 or can do it as a group,
related to a task, sending or obtaining an information or warning message, or disabling or enabling some functions, options, displays, turning on devices or circuits, or menu.

In one embodiment, a context alone (or in combination with the other parameters) is the deciding factor for the determination, to be excluded, or to be included, to perform a task or receive some signal or information. In one embodiment, the identity (e.g. by name, subject to verification, by biometrics, PKI/private/public key, symmetric encryption, smart card, PIN/code, personal ID/password, or their combinations), or the position of the person (e.g. parent (of the driver or user), mother, father, guardian, owner of the business/car, boss, family member, an adult, police, authority figure, owner of the car, power-of-attorney, proxy, or court-appointed person), is the determining factor (alone, or in combination), to be excluded, or to be included, to perform a task or receive some signal or information.

In one embodiment, the biometrics includes the conventional identification methods, such as face recognition, knuckle recognition, eye recognition, iris recognition, fingerprint, finger recognition, signature, voice recognition, handwriting recognition, or pattern recognition, for identification or verification of the presence of the user/driver/passengers in the car, located at various point(s) in the car, for various seats/user(s), with one or more sensors or cameras in the car, and a central processing unit, in the same car, or in a remote location.

In one embodiment, for train, metro, or any public transportation means, the operator's usage can be blocked, and at the same time, a message/warning will be sent to the main station about the attempt or the actual usage of the operator, with proper recordation in a central server, with a time-stamp and number of occurrences. It can cause the emergency brake, disabling the control from operator side, or transferring the control to the headquarters.

In one embodiment, the message or warning can go to the same user, and/or his/her parents, his/her boss, third party (e.g. police), or anybody designated by the user or others. It can be in the form of each or combination of the following: text, telephone call, ring, audio, multimedia, movies, video, siren, vibration, light, flashing light, smell (e.g. releasing/spraying a sharp smell, from a chemical reservoir, container, or box, to warn or shake the user), voice message (standard or customized warnings, by user's voice or others'), predetermined message, customized message, real-time message, automatically conference call initiation, giving options on the user's telephone or computer/computing device, giving options on another person's telephone or computer/computing device, and/or specific music, song, sound, or note, for a specific situation, customized or assigned to, by the user or a third party, to remind the person or user about the specific situation. For example, a specific sound or music may/can/will remind or signal the boss (e.g. owner of the shipping company) that the user/driver/operator number 5 (e.g. among/out of his 25 drivers) has activated the warning or message.

In one embodiment, the following one or more conditions (or their inverse or negative logic counterparts) must be met, to activate the warning or message, to cause an action or task, or to start, enable, stop, or disable a function or task (e.g. stop getting and/or sending text messages and/or voice messages, or both, except, e.g., for to/from emergency numbers (911) or parents' number(s), or alternatively, with no exception, as another embodiment), for user or a third party, determined in real-time or pre-determined before, by user, system, government, laws, rules, or third party:
 ignition is on,
 the key is in ignition slot,
 the car is in the Parking mode,
 the car is in the Drive or Reverse mode, but otherwise stopped by applying brakes,
 the car is moving,
 the car is slowing down (or deceleration),
 the car is speeding up (or acceleration),
 the hand-brake is applied,
 the car is stopped, but the engine is running at idle,
 the tires or wheels are sliding or rotating,
 the speedometer shows a non-zero value,
 the engine speed (RPM, round per minute) shows a non-zero value, and/or
 the car is in the Drive or Reverse mode, and also moving.

The conditions above can be AND-ed, OR-ed, NOR-ed, XOR-ed, or logically combined in other forms, to set more or fewer constraints or conditions on the user or driver, in terms of functions available to the user, regarding his mobile device, PDA, laptop, computer, GPS system, multimedia display, DVD player, CD or CD-ROM player, radio, cell or mobile phone, pager, walkie-talkie, computing device, communication device, or any other device or appliance available as mobile or in the car (or even limiting the functions of the car, such as limiting the gears on the gearbox or stick shift, stopping or slowing the engine, stopping the gas supply, turning off the radio, or similar functions in the car). One can customize the conditions above, for example, one can set the following, as the condition (rule-based condition can be downloaded automatically or pushed from a server maintained, e.g., by a government entity/agency):

IF
(The speed of the car is more than 3 miles per hour, AND
  (the handbrake is not applied, OR the car engine is running, OR the car is not in the "Parking" mode, OR the car key is in the ignition OR activated remotely (for keyless ignition systems)))
THEN
(Disable the texting function in the phone,
AND send a message to the central location, informing the parents,
AND turn off/disable the radio, DVD player, and TV in the car,
AND turn on the headlights on the car, automatically.)

Thus, any kind of condition and restriction/consequences can be applied in the logic of the operation, as long as there is a sensor or device to detect that condition, and there is a switch or controller to disable/enable/control/adjust the outcome, equipment, or parameters. One CPU, server, or central computer in the car (or remotely) can control and adjust all parameters and equipment, sending multiple signals and warnings to different locations for various tasks and acknowledgements (as an example).

In one embodiment, the choices or options are all disabled, partially disabled, all enabled, partially enabled (e.g. disabling text, but still enabling voice functions, or hands-free options), or time-delayed (for example, after the car and/or engine stops (either or both, for different embodiments), enabling the text functionality, delivering the message, or turning on the telephone).

In one embodiment, the BLUETOOTH® (A wireless technology protocol), using a universal code, can be used for transmission and communication between the devices and the telephone. The application can run in the cell or mobile phone, or alternatively, in a central place or server, as a remote location, for example. In one embodiment, the application can run in the background, and checking periodically for the status, to activate or deactivate some function(s)/option(s) or do some task(s). In one embodiment, the telephone is a "smart" device, i.e. all or most of the decisions and processing units are in the handset, itself. In one embodiment, the telephone is a "dumb" device, i.e. all or most of the decisions and processing units are in the central location, e.g. on a server, or at the headquarters, e.g. in a remote place, such as at the telephone company. In one embodiment, the software or updates are pushed from carriers, telephone, car, rental, or service companies (or local/state/federal governments), to individual devices or telephones. In one embodiment, the user downloads the codes or execution software, using hash function or encryption, for security, from a web site or a central place/server.

In one embodiment, the command or the signal from the processing unit forces the engine or car to stop, or put on the brakes for the car, slowly or immediately, or prevent/restrict texting or telephone functions, partially or fully (e.g. turn off the texting unit, or the phone altogether, on the first try, or on the second/third try, by the user, for example, or restricting more on the subsequent tries, for the functionality of the phone or texting, as another example, which requires a counter to count the number of attempts).

In one embodiment, the system is in an enclosure which is tamper-proof. The state or the federal government can check the functionality of the system, on a yearly mandatory basis, so that nobody can open the enclosure or change any settings or parameters within that.

The ID/verification for a person and phone can be obtained from the phone, in one embodiment. In one embodiment, the ID of a person can come from a separate tag, driver's license, key chain, magnetic strip, RFID (passive or active), or smart card (or similar or conventional method/source), while, as a separate (different) source, the telephone ID comes from the telephone (or yet another/third source).

In one embodiment, if the unit is functioning or malfunctioning, the indicator on the car shows to the user, using lights or LEDs, or sound/voice. The police can monitor the status of the unit, or if it functioning properly (e.g. if it was tampered with), using the sensors or signals monitoring the doors, seals, or caps, on the box or enclosure, to find such a status, whenever the car goes for yearly inspection or stopped for any traffic violation, in the close proximity with the police detector or police car. This can be done using, for example, a complete circuit going through the door of the disclosure. So, whenever somebody opens the disclosure, the circuit becomes open, and that can trigger a magnet/wire coil (that feeds from the same circuit) to stop working, causing a metal rod or bar to move a certain direction or drop, by gravity, after the magnet ceases its support or pull on the metal bar or rod, and also, causing some other circuit sending a signal, indicating such tampering and action, to a detector or a central location, such as police. Similar types of tamper-proofing and/or detection have been done by others, and we incorporate any conventional tamper-proofing art here.

In one embodiment, the authorities or authorized personnel can check whether the transceivers are turned on by measuring residual signal power levels around and in proximity to the vehicle.

In one embodiment, tamper proofing is applied to the software modules running on the mobile device and/or localized unit. The tamper checking is performed, for example, when connecting to the service provider/carrier, by downloading a tamper checking software/code/script from the carrier to the mobile device. In one embodiment, the tamper checking software when running on the mobile device checks the feature limiting features of the mobile device (e.g., the triggering program) by use of methods such as determining hash representation of the code and comparing with that from the remote server.

In one embodiment, for the parents, the restriction can be higher than those imposed by the states or federal government, for the children under 18, or above age 18, to drive the car, based on the age and experience, as set by parents. This can also depend on the range of driving, distance from the house (e.g., determined by using GPS), mileage per day (e.g., by using a counter), time of day (more restriction at night), maximum speed, and maximum weight for the cargo for the car. For example, the younger the driver, the more restrictions on the driver, and the less functionality of the telephone, in addition, to limiting the speed of the car, or at least, warning the kid or parents about the high speed (or recording those events with timestamp for future inspection by parents, for exceeding age-related speed limitations or local speed limits).

The cars nowadays have a sensor, based on the weight or pressure, or temperature, which can detect the presence of a person on a seat. In one embodiment, this can be used for detection of the passengers, i.e. the number and positions. For example, if a kid (the driver of a car) has a passenger in front, then if that passenger is identified as a parent/guardian (e.g., based on biometrics or smart card), then he has fewer restrictions, but if that person is not his parents, he will have more restrictions on his telephone functionalities, compared to that of driving alone. In one embodiment, in order to identify the passengers, their mobile devices and their locations are recognized via the local transceivers, the localized unit, and the mobile device(s). Based on the identifications of the mobile devices (e.g., cellular telephone numbers or other identifying features such as SIMS), the identity of the holders are determined. In one embodiment, this method is combined with other identification methods for additional checks.

The rules and restrictions can be updated crossing state lines or boundaries for local governments/cities, downloaded on a kiosks or terminals, remotely, in proximity of the kiosks or terminals (while stopping or moving), by radio signals or magnetic/optical transmission of data (or even cable connections, if the car is stopped to update from those kiosks or terminals). Those rules can also be updated at the yearly inspection stations by the local governments, for all cars.

In one embodiment, the busses and trucks have more restrictions than cars for texting or telephone functions. At dark or night, there are more restrictions than during the daytime. In one embodiment, the family plan for telephone company dictates the rules, or who can change them (rules and restrictions on the usage of phones), with some password or other ID verification techniques. In one embodiment, this system can be integrated with GPS, satellite transmissions, and emergency road services, such as On-Star service. In one embodiment, the settings are done at the factory, based on destination market, according to local rules.

In one embodiment, the following is disabled/enabled/modified, as one feature or combinations:
  keyboard,
  text processing unit,
  text display unit,
  text storing unit,
  text receiving,
  text sending,
  voice receiving, and/or
  voice sending.

In one embodiment, the drunk driver detection, already on the market, can be combined with our system, to report sick, drunk, sleeping, or texting driver, based on the breath analysis/chemical analysis, eye patterns, blinking patterns, breathing patterns, and position of the head for the driver, using face analysis and various pattern recognition methods in the market.

In one embodiment, if the driver receives the text, it will automatically go to one of the passengers, or a designated one(s), based on the identity, telephone ID or number, or the position of the passenger in the car, or the combination of the above. These rules can be predetermined, or set real-time, during driving, by one of the passengers, for example.

In one embodiment, the system periodically searches/detects to see if it is within the range or not, to turn it back on again. For example, after disabling the text earlier, when the car is stopped, or the driver or telephone is removed from the car (when the system detects such a status), the system turns on the texting functions back on again, so that the telephone is fully functional again.

In one embodiment, the presence/identity of the user is determined by triangulation from multiple sensors, or multiple directive antennas, or RFIDs, or magnetic tags, or smart phones, or smart cards, or multiple antennas. In one embodiment, the face recognition or conventional feature/pattern recognition techniques are used for identification of all passengers or driver.

In one embodiment, using multiple sensors, detectors, antennas, tags, reflectors, dishes, transmitters, or receivers, at different locations (in the car, boat, airplane, train, or other vehicles, for personal or commercial use), one can determine the locations of the multiple users/phones in a car (for example). The intensity measurement and/or distance measurement are applied here.

In one embodiment, in each region of the car, there is a set of sensors or transmitters, to detect the presence of a passenger on that area or seat. That will give a binary (Yes/No) answer for the "presence" variable for each seat. This way the passengers for each seat are determined locally. In one embodiment, the passengers for each seat are determined globally, from all the sensors in the car, using the distances or ratios, for example, for intensities, to determine who is in what seat, or which seats are unoccupied.

In one embodiment, 2 kinds of triangulation methods are used, each or both together: (1) based on the relative intensities, (2) based on the delays and timings. When one has the extra points of reference (or redundant antennas or detectors/transmitters/receivers or directional antennas or array of antennas), the extra information can be used to interpolate or extrapolate the other data, to check the validity of the other data, or to average the data, to reduce errors or get a better location or relative position information.

In one embodiment, the microprocessor or controller periodically reads the decoded sequence from the receiver/decoder, and compares it with a stored code. If the decoded code matches a predefined correct code, the microprocessor or controller performs one or more of the following operations:
  Inhibits the display from displaying any sent texts.
  Inhibits texting operation, by disabling the texting function of the mobile device.
  Sends a signal to SMSC to withhold sending text messages to the mobile device, until further notice, and meanwhile, to store the incoming text messages, as one option, if the user desires.

As soon as the mobile device is out of transmitter range and receiver fails to detect the transmitted signal, the microprocessor or controller resets mobile device's texting operation back to normal.

In one embodiment of the invention, the transmitter encodes a predetermined sequence and transmits it through inductive antenna to transceiver unit located in front of steering wheel of the vehicle, the vehicle ceiling over driver's head, or the dashboard section in front of the driver. As the mobile device comes within the reception range of transceiver, transceiver receives the transmitted signal through inductive antenna, decodes the transmitted sequence in the decoder block, and after verification of the decoded sequence, for example, by comparing with a replica of the sequence in its memory, generates a logic 1 bit, to logically AND it with ignition and not-park signals, to enable a transmitter. The transmitter encodes a second predetermined sequence, different from the first predetermined sequence, and transmits it through inductive antenna block to transceiver. Receiver block in transceiver decodes the second sequence, which in turn is read by microprocessor/controller, to disable the display/keyboard, for the user.

Another embodiment employs BLUETOOTH® (A wireless technology protocol) technology operating either over a dedicated channel or a plurality of channels. A transmitter transmitting a dedicated code is installed, as in previous embodiments above, within the steering wheel of vehicle or in another location in the vehicle, in the close vicinity of the driver's seat. Similar to the previous embodiments, when a mobile phone device comes within the reception range of the BLUETOOTH® (A wireless technology protocol) transmitter, the BLUETOOTH® (A wireless technology protocol) receiver of the mobile phone device receives the transmitted code, decodes it, and subsequent to verification, initiates a command sequence in the microprocessor or controller, to disable texting operation, and in addition, to send a message, through the control channel to SMSC, to store and withhold sending the messages destined for that mobile phone device.

In one embodiment, where the speed information is not directly available from the vehicle, the speed dependent rules related to the feature modification may be applied by directly/indirectly estimating the speed of the vehicle. For example, in one embodiment, a GPS or a triangulation technique is used to estimate the location of the vehicle (e.g., using the mobile device being carries in the vehicle) at various times (e.g., sampled every 10 seconds). The speed of the car and/or the direction (vector) is determined by comparing the consecutive location of the vehicle and elapsed time between their sampling using known methods. In one embodiment, the sampling time is reduced if the speed increases or variation in speed along the consecutive points are beyond a threshold.

Figure 14:
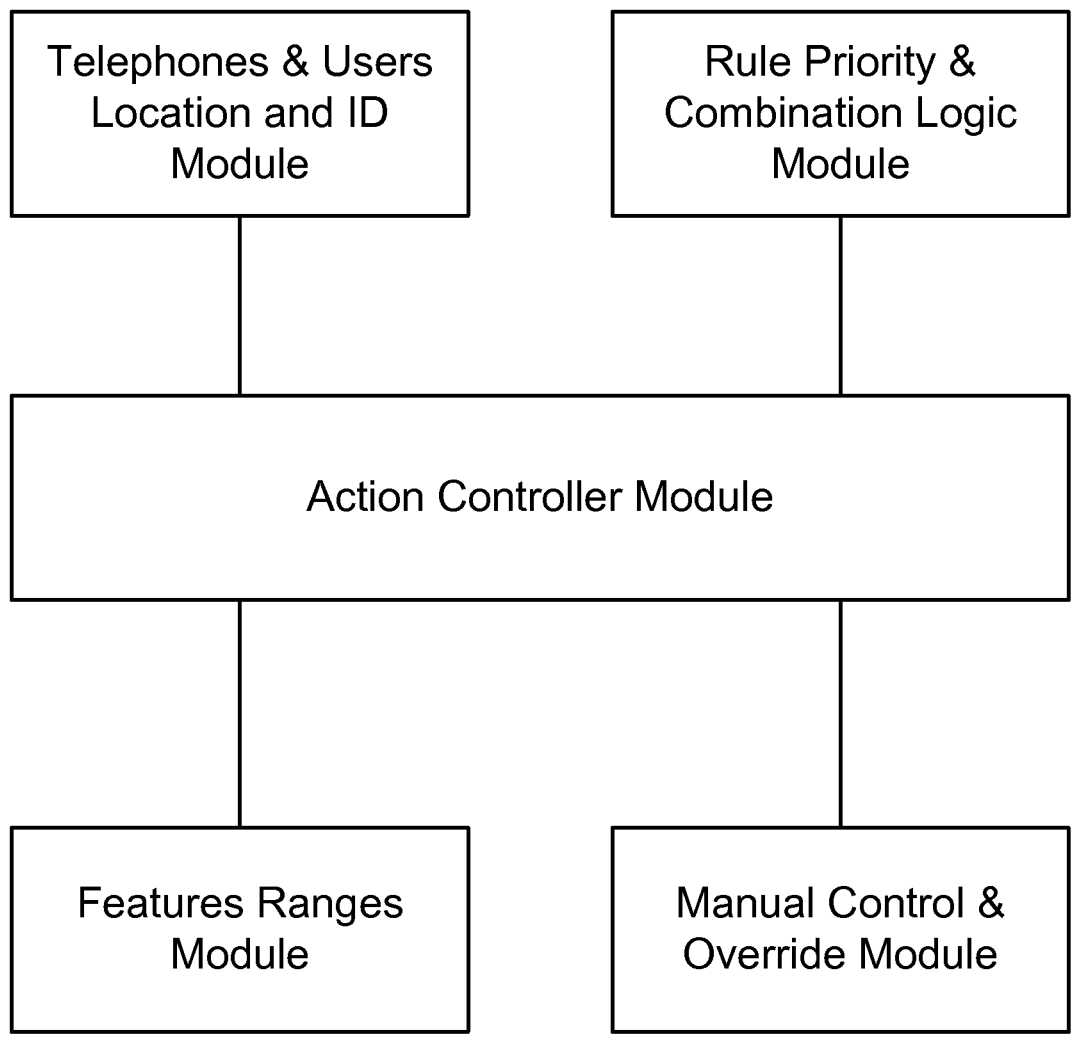
FIG. 14 illustrates an exemplary system with an Action Controller module, used in an embodiment of this invention.
Figure 15:
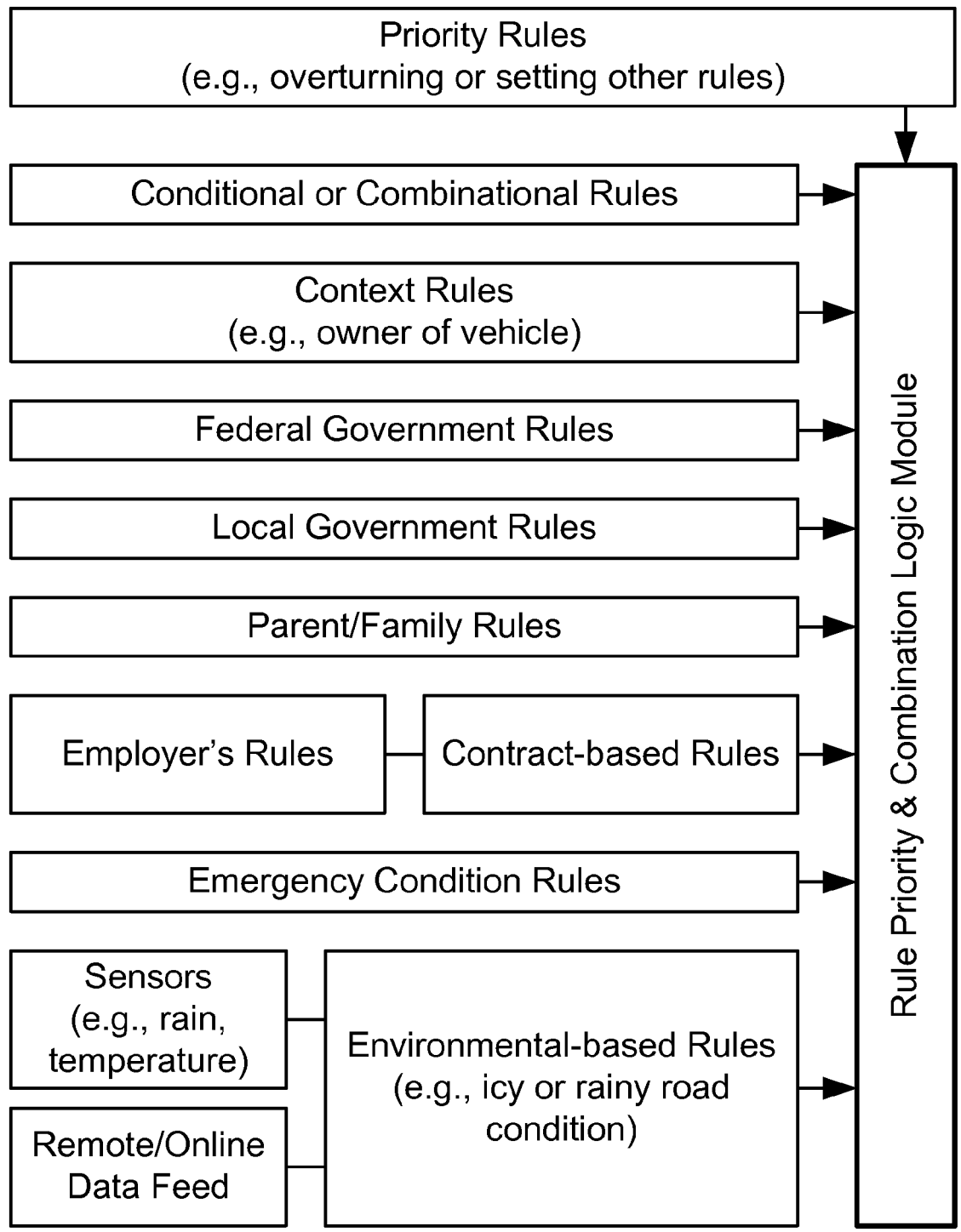
FIG. 15 illustrates exemplary rules input to a Rule Priority and Combination Logic module, used in an embodiment of this invention.
Figure 16:
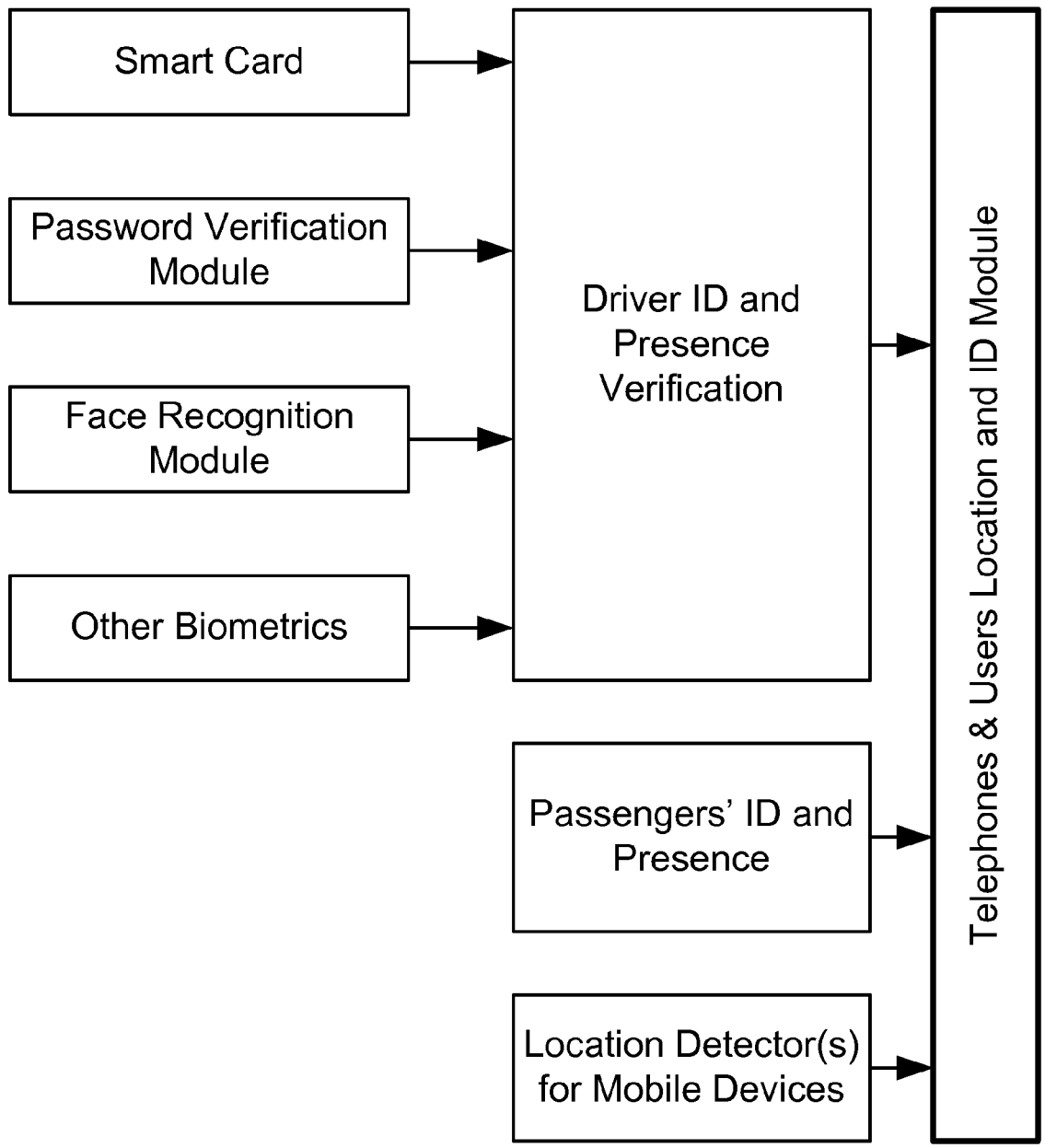
FIG. 16 illustrates exemplary input to a Telephones & Users Location and ID Module, used in an embodiment of this invention.
Figure 17:
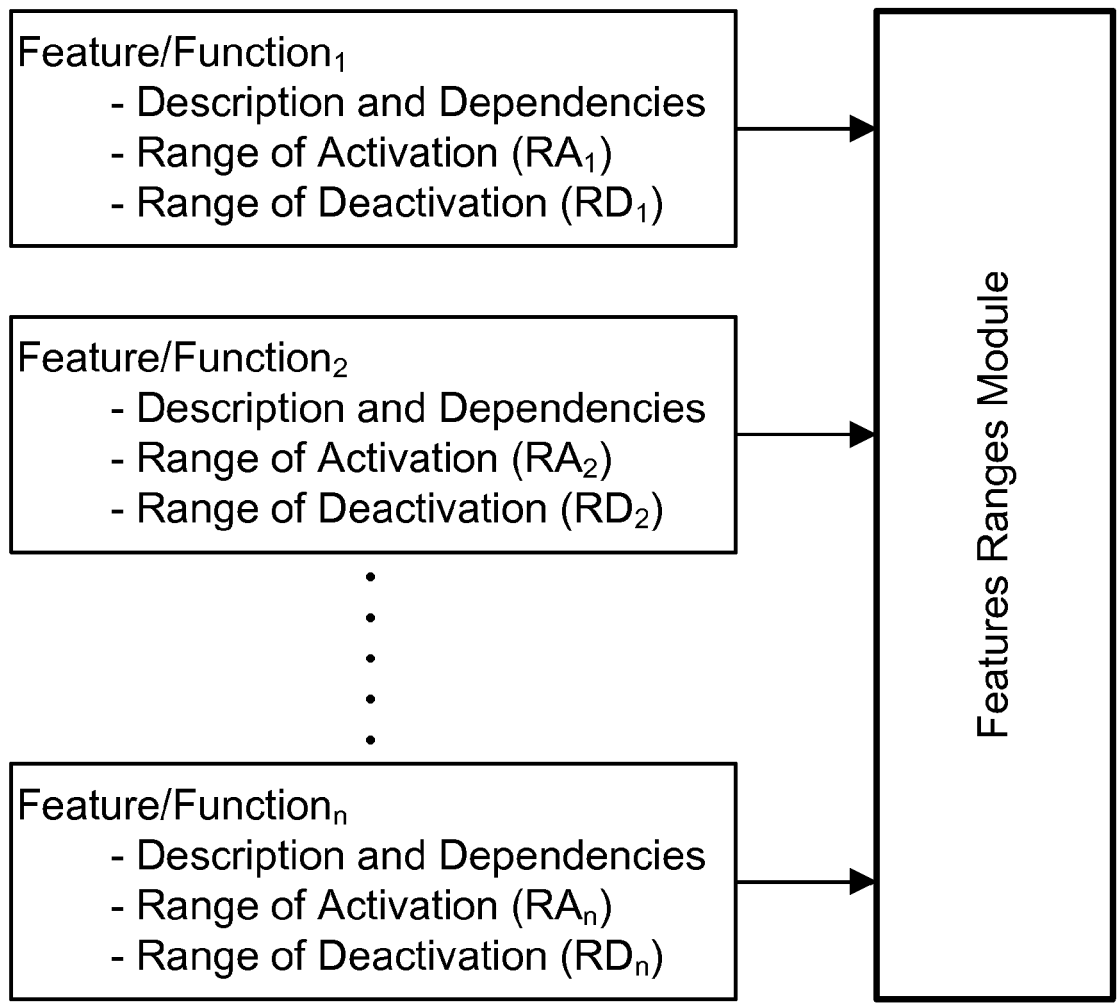
FIG. 17 illustrates exemplary input to a Features Ranges Module, used in an embodiment of this invention.

As one embodiment, FIG. 14 shows the inputs from 4 modules going to the Action controller module, with a possible feedback from the Action controller module to those 4 modules. The Telephone and users location and ID module is shown in FIG. 16 in more details, as one example. The Rule priority and combination logic module is shown in FIG. 15 in more details, as one example. The Features ranges module is shown in FIG. 17 in more details, as one example. There is an optional Manual control and override module, which a user can interfere, change parameters, or stop the operation at different authority levels, if desired, as an example.

FIG. 16 shows different rules and parameters from different modules contributing to the Rule priority and combination logic module. Priority rules describes who and how an entity can overturn another entity or rules, or set the rules. So, in one embodiment, it is a priority listing and ranking, of all members and entities, with higher ranks outweigh/overturn/veto/cancel/modify the lower ranks' votes in the listing. It can also, in one embodiment, include a voting scheme for entities of the same rank, in which a majority, e.g. 51 percent, or super-majority, e.g. 75 percent, can win/vote, collectively as a group. In one embodiment, it specifies which entity can change what parameters and rules, in what condition, and with what credentials. For example, a parent showing the correct identification card, to establish the name and identity, and referring to a database, showing the relationship between parents and kids (and their names), on the weekends, can/has the authority to set the parameters and constraints for the driving of the kids and their telephone usages, during/for the following week.

In FIG. 16, Conditional rules can be, in one embodiment, IF statements or UNLESS statements, such as:
IF the time is after 9 pm,
THEN the telephone voice function is deactivated;
UNLESS the call comes from the parents cell number or home number.

The Combinational Rules can be any logical combinations, such as the following, as one condition:
((a OR b OR c) AND (d XOR e)),
where a, b, c, d, and e are the statements, such as:
"The road is dark."
or
"The road is wet." (e.g., wet and slippery, due to rain)

Federal government rules can be set up to override local rules, and vice versa, according to the laws enforced. Contract-based rules can come directly from a contract, specifying the time of restrictions, the range of restrictions, distances, and other parameters, which is spelled out in a contract between a business owner and the hired drivers for his trucks, as an example.

Emergency condition rules may override all others, in terms of police calling or 911-calls, or any forward calls, showing the Context or Content flag (as a header information) as being the emergency type.

Sensors to measure the temperature and humidity/rain, inside and outside of the car, or current information/forecasts from web sites or weather channel can be fed into the Environment-based module, to find the corresponding rule(s) for that specific weather condition, as an example, and supply that rule(s) to Rule priority and combination logic module, as shown in FIG. 15, as an input.

In FIG. 16, different methods are used to verify the identity of a person or show the presence of the person, as the driver, passenger, or other users. The location of a person can be detected by antennas, reflection, transmission, detectors, or receivers, and analysis of the relative timing and intensity, to locate a person in the car or on specific seat, e.g. before biometric identifications. All of the obtained information is then supplied to the Telephone and users location and ID module.

In FIG. 17, for each function and feature on the phone, for example, for n features (going from 1 to n, where n being a positive integer), we have the description of the feature/function, such as text messages sending or receiving. We have also dependencies, e.g. "text function disabling" which has a relationship with "disabling text message receiving". That is, "text function disabling" is a superset of "disabling text message receiving". That is, whenever the text function is disabled, the text message receiving is also disabled, but the reverse is not always true.

In FIG. 17, whenever an object comes within a range to trigger the function to be modified/disabled, called Range of Modification/Deactivation, or $R_D$, which (in general) may not be exactly the same as the range for the reverse situation, to make the same function restored/activated again, within some range, or Range of Activation, or $R_A$. (The activation or deactivation can be interpreted both for enablement and disablement, respectively, or vice versa.) However, for most cases, the two ranges/radiuses/distances are the same, with the same boundary/border/threshold, for the activation and deactivation process to be triggered, i.e., $R_A = R_D$.

In one embodiment, some or all the information from the modules above will be input to the Features ranges module, as shown in FIG. 17.

Figure 18:
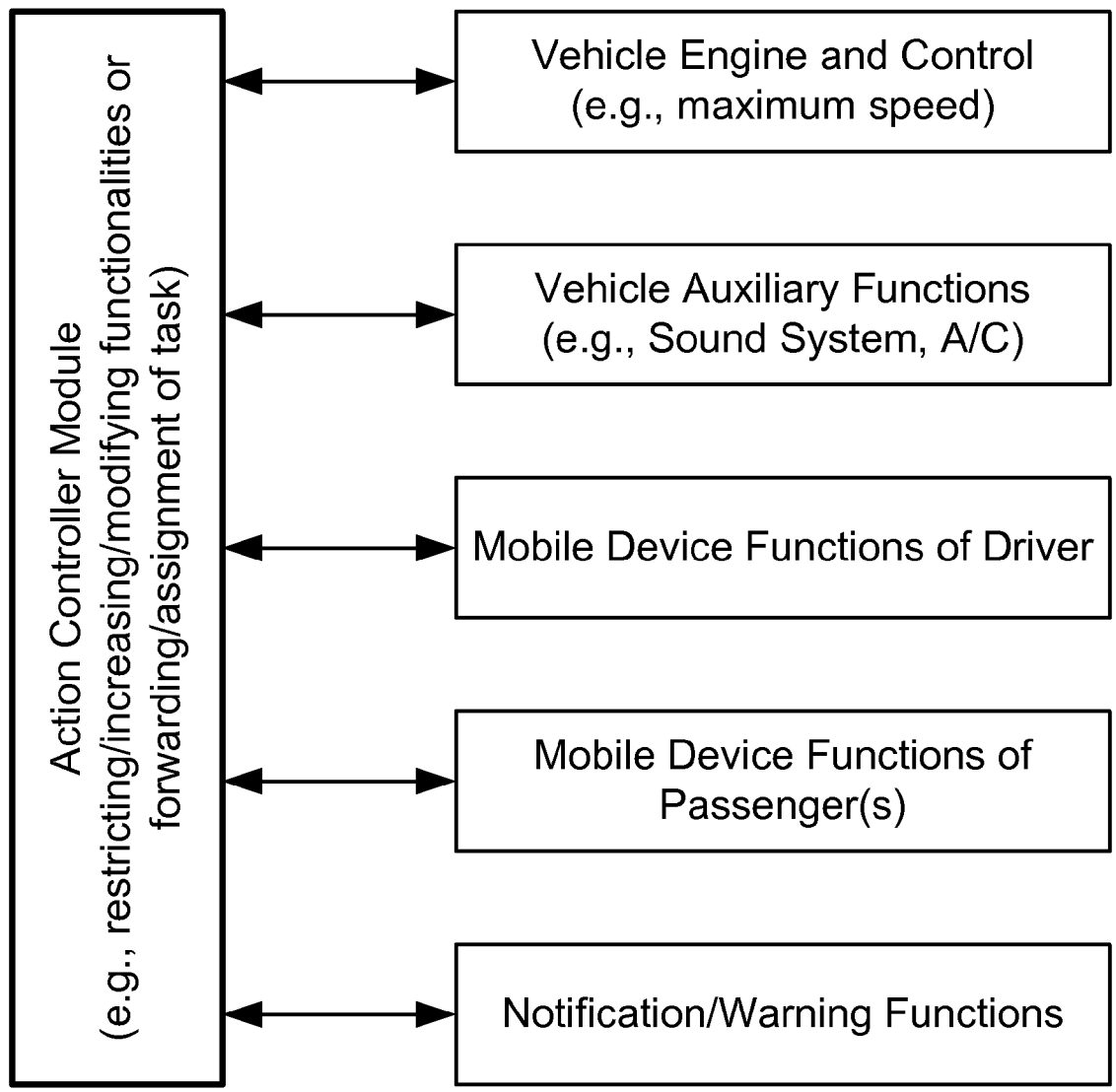
FIG. 18 illustrates exemplary components/features/functions affected by an Action Controller Module, used in an embodiment of this invention.

In FIG. 18, we have Action Controller Module, which may increase, decrease, or modify the scope, the number of available functions, functionalities, choice list, or menu list of the possible actions for a given device. Alternatively, it may forward the function or task to another entity or user, or re-assign the task(s), partially or fully, e.g. transferring the text message intended for the driver to a passenger in the car, i.e. to a second phone, as a forward message, so that the passenger can respond/listen/talk to the phone/text message/voice message, in real-time, or as stored message, with an optional copy stored for the driver for his later review, with an option for the driver to also review the response of the passenger, as well, in terms of recorded voice or text, at a later time, e.g. when he is not driving anymore, and his telephone is activated again.

This can be extended to a conference call for multiple users and multiple drivers/multiple passengers, all at the same conference call, using voice and/or text.

In FIG. 18, Action Controller Module can control engine speed, car speed, car acceleration (e.g. amount of gas and air supplied), the max or min gear functional (on gear box), or amount of current or voltage supplied (e.g. for electric cars); equipment in the car, such as sunroof and radio (e.g. on/off switch, and volume for sound adjustment, based on a maximum level); type of functions available for mobile devices and communication/personal/computing gadgets, for different users at different locations and with different responsibilities, such as driver and passenger(s), in front and back seats, for example.

In FIG. 18, Action Controller Module can control type and method of delivery, plus the frequency of delivery, of messages, notifications, and warnings, in addition to who gets it, in what order. For example, Action Controller Module sends a warning message to a father, every minute, or in higher frequency later on, with a special ring and follow up recorded voice message, first, about the receiving text message by a teenage driver (his son). Then, later, it would send a second message to his mother (of the driver), with text message, only, every 5 minutes, warning about this incident, with no or different ring tone. There is a list of recipients, with the order of receiving, in one embodiment. In one embodiment, there is a forwarding list, and there is another list for when/in case the father and the mother cannot answer the phone, as the emergency backup numbers, or the list of people to contact later on.

In one embodiment, biometrics or other types of identification is used to identify the driver (e.g., by using a finger print scanning device located at or near the steering wheel, ignition button or other controls). Based on the driver's identification, information such as rules/configurations are queried from a database(s) in one embodiment. The associated mobile devices are identified (e.g., by their service carrier and cellular telephone number) based on the driver's identification, e.g., by querying the identification database(s). In one embodiment, the gathered information is provided to an Action Controller module to effectuate modifications on features/functionalities of vehicle and/or the mobile device(s) based-on rules and environmental context.

One can use a separate code for personal identification of the user, as an example. Each telephone can have a universal or a unique code for identification of the telephone. The user code and telephone codes can be added or combined. In one embodiment, the directional antennas are used, for detection of the location of the users or phones. In one embodiment, the messages are re-routed or stored in a remote place. In one embodiment, multiple points/transceivers of the car are used for sending signals, and also multiple points are used for receiving the signals or reflections of the signals. In one embodiment, the software and instructions/codes are stored on a magnetic or storage media, such as hard drive or memory stick, to be run by a computing device or processor, to implement the methods and steps taught in this disclosure.

In one embodiment, the signal or task or message is forwarded to multiple users, who may in the car, or may be outside of the car, away from the driver of the car, e.g. in another car. In one embodiment, for position detection, for user or phone, one can use a beacon using sound, light, or flashing light, or tags using RFID, to find and identify the objects. The range for detection can be expressed as length, e.g. feet or meter, or as voltage or current for the threshold of the detected signal, as detected by the detectors, sensors, or receivers, based on their prior calibrations, so that it can be mapped to corresponding distances, in terms of meter or feet, for the thresholds, for the detection purposes, for users or phones.

In one embodiment, GPS is used to find the relative or absolute positions of objects. In one embodiment, one can turn off or on a device, such as phone or a module in the phone, or with a timer, with delay, or gradually reduce the voltage or current to zero, e.g. using a slide or variable resistor. In one embodiment, the monitoring is done using a continuous or periodic schedule, triggered by a clock, for example, or manually, by a user or third party, so that if the phone is in/out of the range, or crosses the boundaries, it can be detected in its new status and position.

In one embodiment, RF communication is used between components, or any other parts of spectrum. In one embodiment, the restriction on speed of car is applied for the young driver. In one embodiment, the notifications can go from the reverse directions as well, based on teachings above, i.e. from device A to B, as an example, rather than device B to A, as in the teaching above, or going through a proxy, sending a notification to the server or central location, e.g. for status/location of the phone, e.g. notification that if the phone is in the range, or if it is outside the range.

In one embodiment, a time difference between 2 or more reflected signals, with respect to a base time of another signal, e.g. original signal, can be used to find the time delay, or distance differences between different objects, based on the speed of light or sound, as the source, to pinpoint different objects in the car, and find/independently verify the position of users and phones.

In one embodiment, the features to be disabled or modified/limited are speed dependent (i.e. the speed of the vehicle), or based on the age of the driver. In one embodiment, the expiration time or extension time periods for modifying a feature can be speed dependent, for example, for different ranges of speed, different ranges/classes of features are disabled/modified, e.g. for low speed range, sending SMS is disabled, and at higher speed range, receiving SMS is disabled, as well.

In one embodiment, Multimedia messaging service (MMS), movies, video, songs, lectures, books, text, and recorded voices can also be applied to this teaching here. In one embodiment, a computer readable media is used to store the data or executable codes to run the software for the implementation of the methods and steps of this invention.

In one embodiment, when a user plugs the phone to a battery charger at a vehicle, the mobile device recognizes the power plug attachment event and inquiries the user to indicate whether the current location is in a vehicle (on mobile device user interface or on the car user interface, for example), and/or whether the user intends to drive. If the user indicates YES, the mobile device modifies the features, such as disabling SMS and/or a message is sent to SMSC or a remote service to withhold messages and/or calls. In one embodiment, the mobile device user interface does not let the user proceed, until the user answers the inquiry, or the power cord is unplugged.

In one embodiment, once the mobile device receives a message indicating total shut-down from the localized transceiver, it turns itself off, after e.g. verifying the associate ID with the transceiver. For example, this is used in a theater setting, to reduce the unwanted/disturbing calls during presentation.

In one embodiment, instead of the SMS messages at SMSC, the SMS messages are stored on the mobile device, and the response that the user cannot respond in person is sent to the sender. In one embodiment, SMSC sends similar message to the sender, when storing and not forwarding the messages to the mobile device, due to modification of the feature on the mobile device. In one embodiment, the SMSC keeps track of the enablement and modification times of the mobile device and the senders, so that it would send the automatic response to a sender only once, if the feature has not since been enabled. This prevents a possible infinite loop of messages between disabled senders and receivers.

In one embodiment, when the modifying feature is receiving telephone calls, special answering reply is used at the answering service, to indicate to the caller that, e.g. "The callee is currently driving, and cannot accept a phone call.". In one embodiment, once the mobile device features is being modified, the mobile device (or localized unit) sends a message to a service at the telephone service provider with a code indicating e.g. to modify the reply message, in answering service and/or hold incoming calls and direct them straight to the answering service. In one embodiment, the telephone service sends a message to the mobile device, indicating that a call went straight to the answering service, e.g. indicating to the user with a special audio tone/sound.

In one embodiment, when the modifying feature relates to phone calls or messaging, and a car is equipped with hands-free telephone and messaging features, then messages and/or calls are forwarded to the hands-free device, for example, by forwarding the messages/calls from the service provider/carrier, to the phone number or SIP address or other identifications, associated with the hands-free device.

In one embodiment, when modifying a feature on a mobile device, if a 2nd mobile device is available, the limited functionality is used on the 2nd mobile device, by forwarding calls and/or messages to the 2nd mobile device, directly, from the limited mobile device, e.g. via a communication link, such as BLUETOOTH® (A wireless technology protocol). In one embodiment, when the limitation is lifted, the on-going calls remain connected on the 2nd mobile device, for continuity, by e.g. continue to forward voice data from the 1st mobile device to the 2nd. On the completion of the phone call, the new calls would not be forwarded to the 2nd mobile device. In one embodiment, the limited feature mobile device recognizes other mobile devices, e.g. in a piconet, established via BLUETOOTH® (A wireless technology protocol), and queries a preconfigured list of trusted mobile devices to determine whether the calls or messages can be forwarded to the 2nd mobile device. In one embodiment, there is a priority settings used to determine which mobile device among available ones in the piconet should get the forwarded messages/calls. In one embodiment, the forwarding number/person's name/ID, corresponding to the 2nd mobile phone, is entered/specified on-demand in real-time, by the user or authority, e.g. on 1st mobile device, or from a car/vehicle. In one embodiment, the proximity (the nearest phone to the driver, or the closest passenger detected, for example, based on the RF power level, or based on location determination by other methods, mentioned here in this disclosure) is used to identify/assign the 2nd mobile phone, for this purpose.

In one embodiment, the sound goes from top speakers in the car for telephone voice or music to speakers on the foot-level, underneath, or transfer the sound to speakers on the back seats, to focus/de-focus and alert the user or listener/driver about the telephone, or put more focus on the road, to prevent accidents.

In one embodiment, the smart cards or tags/magnetic IDs are read by a reader, in contact or remotely, to identify the person, or role, e.g. parent, based on a connected database, e.g., to show the relationships between people, e.g. names of children and parents, connected/referred to, in the database, or otherwise, found on the smart cards or tags of the parent or child, e.g. mentioning the ID card or number/code for the other person, i.e. the child or parent, respectively, pointing to the other person, as a method of verification or locating the other person, to activate the rules and proximity conditions, e.g. when the passenger is the parent, and the driver is the kid, in which case some restrictions on the kid is relaxed, or e.g. the calls are forwarded to the parent's phone automatically. In one embodiment, when two cards are in the vicinity of each other, they signal each other, to recognize each other (having antennas, and also power source, at least on one of them), for the conditions mentioned above, to recognize that the parent is sitting next to the kid/driver.

Wherever a vehicle is used in this disclosure, the teaching may be generalized to other enclosures such as train, airplane, boat, metro-rail, bus, trucks, air-borne or sea-borne vessel, or air-traffic controller or un-manned airplane controller seating areas.

The tasks in this disclosure can be implemented/performed by software/hardware/firmware or a combination, in a local, central, or remote location, partially or fully.

This invention can apply to any functions for any mobile device. It does not have to be limited to a vehicle or car. The driver can be generalized as the user. The passenger can be generalized as the $2^{nd}$ class of users. The parents can be generalized as authority, police, owner, boss, or government.

All data information including executable codes/scripts/programs/tasks are stored in one or more storages in various modules and systems described in this disclosure. In addition, the systems and modules have various processing units/CPUs to execute/run such executables. The communication and data transfers are performed via wireless/wired/optical/sound/voice medium and devices. For example, using voice recognition and pattern recognition devices can be used to recognize an individual's voice or sounds (e.g., notes, whistles) commands or statements to for example initiate an event to be performed by various devices and processes running on those devices (e.g., SMS forwarding).

A system, an apparatus, a device, or an article of manufacture comprising one of the following items or features mentioned above is an example of this invention. A method comprising one of the following steps, features, or items mentioned above is an example of this invention. Any variations of the above teaching are also intended to be covered by this patent application.

The invention claimed is:

1. A method for communicating a message regarding a function for a mobile communication system, said method comprising:
   a first antenna of said mobile communication system receiving data communication via a wireless network;
   communicating a first code between a first short-range wireless transceiver and said mobile communication system via a second antenna of said mobile communication system, at an in-range vicinity of said first short-range wireless transceiver;
   wherein said first short-range wireless transceiver is outside of said first mobile communication system;
   determining a first in-range event, based on a first wireless signal transmitted between said first short-range wireless transceiver and said second antenna;
   marking a first set of one or more functions related to said data communication corresponding to said first mobile communication system for modification, based on said first in-range event; and
   in case of a usage of a first function of said first set of one or more functions related to said data communication via said first mobile communication device by a user, communicating a message about said usage of said first function by said first mobile communication system.

2. The method for communicating a message regarding a function for a mobile communication system as recited in claim 1, wherein said message comprises a marked status of said first function related to said data communication.

3. The method for communicating a message regarding a function for a mobile communication system as recited in claim 1, wherein said message is communicated to said user.

4. The method for communicating a message regarding a function for a mobile communication system as recited in claim 1, wherein said message is stored in a memory device.

5. The method for communicating a message regarding a function for a mobile communication system as recited in claim 1, wherein said message is received by a central server.

6. The method for communicating a message regarding a function for a mobile communication system as recited in claim 1, wherein said message comprises time-stamp of said usage.

7. The method for communicating a message regarding a function for a mobile communication system as recited in claim 1, wherein said message comprises a status of a vehicle associated with said first short-range wireless transceiver.

8. The method for communicating a message regarding a function for a mobile communication system as recited in claim 7, wherein said status of said vehicle comprises speed of said vehicle.

9. The method for communicating a message regarding a function for a mobile communication system as recited in claim 1, wherein said message is based on one or more attributes of said user, wherein said one or more attributes are stored in a memory unit.

10. The method for communicating a message regarding a function for a mobile communication system as recited in claim 1, wherein said message is communicated via text.

11. The method for communicating a message regarding a function for a mobile communication system as recited in claim 1, said method further comprising:
sending communications via first antenna of said first mobile communication system, using a second function related to said data communication corresponding to said first mobile communication system;
wherein said second function is not in said first set of one or more functions related to said data communication.

12. The method for communicating a message regarding a function for a mobile communication system as recited in claim 1, wherein said message is communicated from a controller module in a vehicle associated with said first short-range wireless transceiver.

13. The method for communicating a message regarding a function for a mobile communication system as recited in claim 1, wherein said message is communicated from said first mobile communication system.

14. The method for communicating a message regarding a function for a mobile communication system as recited in claim 1, wherein said message is communicated from a data service provider.

15. The method for communicating a message regarding a function for a mobile communication system as recited in claim 1, wherein said message is communicated to a predetermined entity periodically.

16. A method for communicating a message using a mobile communication system, said method comprising:
a first antenna of said mobile communication system receiving data communication via a wireless network;
communicating a first code between a first short-range wireless transceiver and said mobile communication system via a second antenna of said mobile communication system, at an in-range vicinity of said first short-range wireless transceiver;
wherein said first short-range wireless transceiver is outside of said first mobile communication system;
determining a first in-range event, based on a first wireless signal transmitted between said first short-range wireless transceiver and said second antenna;
determining an identity of a user associated with said mobile communication system, based on an identification of said mobile communication system;
querying one or more attributes associated with said user;
wherein said one or more attributes are stored in a database;
determining a status of a vehicle associated with said first short-range wireless transceiver; and
based on said first in-range event, said status of said vehicle, and said one or more attributes, communicating a message.

17. The method for communicating a message using a mobile communication system as recited in claim 16, wherein said message is communicated to a designated entity.

18. The method for communicating a message using a mobile communication system as recited in claim 16, wherein said message is stored in a computing device.

19. The method for communicating a message using a mobile communication system as recited in claim 16, wherein said message is received by a central server.

20. The method for communicating a message using a mobile communication system as recited in claim 16, wherein said message comprises time-stamp.

21. The method for communicating a message using a mobile communication system as recited in claim 16, wherein said message comprises said status of said vehicle.

22. The method for communicating a message using a mobile communication system as recited in claim 21, wherein said status of said vehicle comprises speed of said vehicle.

23. The method for communicating a message using a mobile communication system as recited in claim 16, wherein said message is communicated via text.

24. The method for communicating a message using a mobile communication system as recited in claim 16, wherein said message is communicated from a controller module in said vehicle.

25. The method for communicating a message using a mobile communication system as recited in claim 16, wherein said message is communicated from said first mobile communication system.

26. The method for communicating a message using a mobile communication system as recited in claim 16, wherein said message is communicated from a data service provider.

27. The method for communicating a message using a mobile communication system as recited in claim 16, wherein said message is communicated to a predetermined entity periodically.

28. The method for communicating a message using a mobile communication system as recited in claim 16, wherein said database is in said mobile communication system.

29. The method for communicating a message using a mobile communication system as recited in claim 16, wherein said database is in a controller module associated with said vehicle.

30. The method for communicating a message using a mobile communication system as recited in claim 16, wherein said database is accessible via a network associated with a data service provider.

31. The method for communicating a message using a mobile communication system as recited in claim 16, wherein said method comprises:
transmitting said status of said vehicle via a wireless link.

* * * * *